(12) United States Patent
Johnson

(10) Patent No.: US 6,871,197 B1
(45) Date of Patent: Mar. 22, 2005

(54) METHOD AND MECHANISM FOR A WEB BASED KNOWLEDGE MANAGEMENT TOOL

(75) Inventor: Thomas H. Johnson, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 366 days.

(21) Appl. No.: 10/082,941

(22) Filed: Feb. 25, 2002

(51) Int. Cl.[7] .......................... G06N 5/04; G06E 15/18; G06F 17/00

(52) U.S. Cl. ............................. 706/61; 706/14; 706/12

(58) Field of Search .............................. 706/61, 14, 12

(56) References Cited

U.S. PATENT DOCUMENTS

| | | | |
|---|---|---|---|
| 2001/0025309 A1 * | 9/2001 | Macleod et al. | 709/223 |
| 2001/0056398 A1 * | 12/2001 | Scheirer | 705/38 |
| 2002/0065802 A1 * | 5/2002 | Uchiyama | 707/1 |
| 2002/0103777 A1 * | 8/2002 | Zhang | 706/59 |
| 2002/0123957 A1 * | 9/2002 | Notarius et al. | 705/37 |
| 2002/0178031 A1 * | 11/2002 | Sorensen et al. | 705/2 |
| 2003/0135393 A1 * | 7/2003 | Burgess | 705/3 |

OTHER PUBLICATIONS

Oracle Corporation, "Oracle9/AS Portal Developer Kit (PDK)," Oct. 31, 2001, pp. 1–6, http://portalstudio.oracle.com/pls/ops/docs/folder/community/pdk/articles/overview.portlets.html.

Oracle Corporation, "Oracle9/AS Portal, Feature Overview,", May 2002, pp. 1–7, http://portalstudio.oracle.com/pls/ops/docs/folder/community/otn_content/mainpage/keyfeatures_benefits/portal_FOV.html.

Oracle Corporation, "Oracle Application Server 10g, Oracle AS Portal," Sep. 2003, pp. 1–9, http://portalstudio.oracle.com/pls/ops/docs/folder/community/otn_content/mainpage/keyfeatures_benefits/portal_$FOV_{13}$ o.html.

Oracle Corporation, "Oracle Application Server Portal Overview," Sep. 2003, pp. 1–4.

Oracle Corporation, "Creating and Managing Sites—Task Halp," Oct. 1999, pp. 111–197.

Oracle Corporation, "Oracle8/™ Release 2 New Features Summary," Nov. 1999, 17 pgs.

Oracle Corporation, "Oracle Application Server Portal 10g (9.0.4) Product Overview, An Oracle White Paper," Sep. 2003, pp. 1–9.

Oracle Corporation, "Oracle9/AS Portal Release 2—Technical Overview; An Oracle White Paper," Apr. 2002, pp. 1–30.

Oracle Corporation, "Oracle9/AS Portal Release 2 (Version 9.0.2): New Features; An Oracle White Paper," May 2002, pp. 1–34.

* cited by examiner

Primary Examiner—Anthony Knight
Assistant Examiner—Joseph P. Hirl
(74) Attorney, Agent, or Firm—Bingham McCutchen LLP

(57) ABSTRACT

A method and mechanism for a web based knowledge management tool. A knowledge management tool enables one to interact with a knowledge base and enable distributed collaboration between parties. Users may create and customize portlets to interact with the knowledge base in a variety of formats, such as, e.g., a survey and a FAQ. The information describing the appearance and operation of the portlets is stored within a database coupled to a portal database server, which is a component that provides content pertaining to a portal web site to one or more web browsers 101. Graphical based reports based upon user activity may be dynamically generated and subsequently displayed through portlets as well.

70 Claims, 26 Drawing Sheets

Upload Users

Overview — User Upload — Review and Confirm — Upload Complete

Review and Confirm

Check the list of Users and make any additions, deletions or corrections you need, then press the Next button to create the users. Press the + icon to add a user. Press the x icon to delete a row. Type a Y in the Def column if you want the Group to be the Default Group for the user. Press the Cancel button to exit without creating the users.

| + | UserID or Email* | Password | Email* | Group | Def | Error — 610 |
|---|---|---|---|---|---|---|
| x | FIRSTUSER | FIRSTUSER | FIRSTUSER@US.ORACLE.COM | TEST_GROUP | Y | |
| x | TESTUSER | TESTUSER | TESTUSER@US.ORACLE.COM | BAD_GROUP | Y | User already exists! Group does not exist |
| x | SECONDUSER | SECONDUSER | SECONDUSER@US.ORACLE.COM | TEST_GROUP | Y | |
| x | THIRDUSER | THIRDUSER | THIRDUSER@US.ORACLE.COM | TEST_GROUP | N | |

(Cancel) (Back)-step 3 of 4-(Next) (Finish)

Home   Help

*FIG. 6*

Upload Users

Overview — User Upload — Review and Confirm — Upload Complete

Upload Results

Upload completed. Please review the results. Press the Finish button to exit.

| UserID or Email | Password | Email | Group | Def | Status |
|---|---|---|---|---|---|
| FIRSTUSER | FIRSTUSER | FIRSTUSER@US.ORACLE.COM | TEST_GROUP | Y | User created Folder already exists! |
| TESTUSER | TESTUSER | TESTUSER@US.ORACLE.COM | BAD_GROUP | Y | User already exists! Group does not exist! Folder already exists! |
| SECONDUSER | SECONDUSER | SECONDUSER@US.ORACLE.COM | TEST_GROUP | Y | User created Folder already exists! |
| THIRDUSER | THIRDUSER | THIRDUSER@US.ORACLE.COM | TEST_GROUP | N | User created Folder already exists! |

(Cancel) (Back) - step 4 of 4 - (Next) (Finish)

FIG. 7

End of Survey Options

The following buttons allow selection of the way the survey behaves after the respondent finishes answering all the questions. Please select one of the following. — 1550

- ⊙ Show Chart of Responses
- ○ Show Report of Responses
- ○ Allow Editing of Responses
- ○ Show Nothing

Messages to Recipients

Welcome message: `Welcome to the Entertainment Survey.`

Enter a welcome message to your survey recipients. This text will precede the first question and could be used for instructions or disclaimers. — 1560

☑ Show only the Welcome message on the first page of the Survey.

Closing comments:: `Thanks for taking the Entertainment Survey.`

Enter closing comments for your survey. This text will go after the last question and could be used to thank recipients or let them know when results will be published. — 1570

(Cancel) (Back) -step 2 of 4- (Next) (Finish)

Question List

The following are the questions you have entered. Use the controls on the left to edit, delete, or reorder questions.

1660 — ⊞ Main
    ⊟ X  ⇩ ✎ 1) Do you have any hobbies?
1685 —         Yes⇨Hobbies —1690
        No —1690
    ⊟ X ⇧ ⇩ ✎ 2) Do you like sports? —1670
    ⊟ X ⇧   ✎ 3) Do you like cars? —1670

1660 — ⊞ X Hobbies
    ⊟ X  ⇩ ✎ 1) Do you like to play chess?
    ⊟ X ⇧ ⇩ ✎ 2) Do you like to dance?
    ⊟ X ⇧   ✎ 3) Do you collect stamps?

1660 — ⊞ X Sports
    ⊟ X  ⇩ ✎ 1) Which football team do you like?
    ⊟ X ⇧ ⇩ ✎ 2) Which basketball team do you like?
    ⊟ X ⇧   ✎ 3) Which baseball team do you like?
   +                 —1680
1680 —

---

Edit Survey: Entertainment

O———O———O———O
Overview   Survey   Question   Review and
         Setup    Creation    Confirm Question Creation You can create as many questions as you wish. For each question specify the question text, style and answer choices in the boxes provided. Use the question list on the left to edit and reorder questions. When you have finished entering a question, click "Add another" to begin a new question. Click "Next" when you have entered the last question.

Section: [Main ▼]
Question: [Do you have any hobbies?]
Display Style: [Check Box ▼]
     ☐ Allow Multiple Responses.
     ☐ Include "Other" choice and "Please Explain" field
     ☒ Optional Answer choices: [Yes
                No
                          ]

Type your answer choices above, one choice per line. Press "Enter" after every answer choice you type in.

This answer: [Yes ▼]
Triggers section: [Hobbies ▼]

(Add another question...)

(Cancel) (Back) -step 3 of 4- (Next) (Finish)

Edit Survey: Entertainment

Overview — Survey Setup — Question Creation — Review and Confirm

Review and Confirm

You have completed the definition of your survey. Press the "Back" button to check and correct your work. Press the "Finish" button when you are satisfied with your entries. Press the "Cancel" button to end the process without saving your work.

(Cancel) (Back) -step 4 of 4- (Next) (Finish)

---

Welcome to the Entertainment Survey

| *Last Name | Cole |
| *First Name | Thomas |
| Middle Name | Z. |
| *E-mail | Thomas.Cole@oracle.com |

1) Do you have any hobbies?
(Choose one answer) (Optional)
  ☐ 1) Yes
  ☐ 2) No

2) Do you like sports?
(Choose one or more answers)
  ☐ 1) Yes
  ☐ 2) No

3) Do you like cars?
(Choose one answer)
  ☐ 1) Yes
  ☐ 2) No

Thanks for taking the Entertainment Survey

*FIG. 17*

Edit Survey Answer Form Portlet Settings

Survey Answer Form Portlet Settings
Customize the settings for the Survey Answer form.

Survey Name: [Entertainment]
Start Date: [11/19/2002] (MM/DD/YYYY)
End Date: [          ] (MM/DD/YYYY)
Questions Per page: [All] (#or "All" - max 99 per page)

| Item | Font Face | Color | Size | A | *A* | A |
|---|---|---|---|---|---|---|
| Portlet Background | | Browser Default ▼ | | ☐ | ☐ | ☐ |
| Welcome Message | Browser Default ▼ | Browser Default ▼ | +0 ▼ | ☐ | ☐ | ☐ |
| Closing Comments | Browser Default ▼ | Browser Default ▼ | +0 ▼ | ☐ | ☐ | ☐ |
| Questions | Browser Default ▼ | Browser Default ▼ | +0 ▼ | ☐ | ☐ | ☐ |
| Question Instructions | Browser Default ▼ | Browser Default ▼ | +0 ▼ | ☐ | ☐ | ☐ |
| Answers | Browser Default ▼ | Browser Default ▼ | +0 ▼ | ☐ | ☐ | ☐ |
| Identification Info. | Browser Default ▼ | Browser Default ▼ | +0 ▼ | ☐ | ☐ | ☐ |

[Apply] [OK] [Cancel]   Home

Welcome Thomas

Navigator   Home

Edit Page   Customize   Account Info   Logout

/Apps/

Entertainment

1) Do you have any hobbies?
(Choose one answer) (Optional)
    ☑ 1) Yes
    ☐ 2) No 2) Do you like sports?
(Choose one or more answers)
    ☑ 1) Yes
    ☐ 2) No 3) Do you like cars?
(Choose one answer)
    ☑ 1) Yes
    ☐ 2) No (Back | Next)

*FIG. 18B*

Edit Survey Response Report Portlet Settings

Survey Response Report Portlet Settings
Customize the settings for the Survey Response Report.

Survey Name: [Entertainment ▼]
Start-End Date: [10/03/2002 - no and data ▼]
Questions Per page: [All ▼] (# or "All" - max 99 per page)
Order By: [Count Descending ▼]

| Item | Font Face | | Color | | Size | | |
|---|---|---|---|---|---|---|---|
| | | | | | A A A | | |
| Portlet Background | | | [Browser Default ▼] | | | | |
| Sub-heading | [Browser Default ▼] | | [Browser Default ▼] | | [+0 ▼] | □ □ □ | |
| Totals | [Browser Default ▼] | | [Browser Default ▼] | | [+0 ▼] | □ □ □ | |
| Questions | [Browser Default ▼] | | [Browser Default ▼] | | [+0 ▼] | □ □ □ | |
| Answers | [Browser Default ▼] | | [Browser Default ▼] | | [+0 ▼] | □ □ □ | |

[Apply] [OK] [Cancel]    Home

|  | Welcome Thomas |
|--|--|
|  | Navigator Home Help |
|  | Edit Page Customize Account Info Logout |
|  | /Apps/ |

Entertainment

(03 October 2001 - no ending date)
Total respondents: 1

| Do you have any hobbies? | Number of Responses | Percentage |
|---|---|---|
| Yes | 1 | 100% |
| No | 0 | |
| Total | 1 | |

| Do you like sports? | Number of Responses | Percentage |
|---|---|---|
| Yes | 1 | 100% |
| No | 0 | |
| Total | 1 | |

| Do you like cars? | Number of Responses | Percentage |
|---|---|---|
| Yes | 1 | 100% |
| No | 0 | |
| Total | 1 | |

Hobbies

| Do you play chess? | Number of Responses | Percentage |
|---|---|---|
| Yes | 1 | 100% |
| No | 0 | |
| Total | 1 | |

| Do you like to dance? | Number of Responses | Percentage |
|---|---|---|
| Yes | 1 | 100% |
| No | 0 | |
| Total | 1 | |

| Do you collect stamps? | Number of Responses | Percentage |
|---|---|---|
| Yes | 1 | 100% |
| No | 0 | |
| Total | 1 | |

| Sports | | |
|---|---|---|
| Which football team do you like? | Number of Responses | Percentage |
| 49rs | 1 | 100% |
| Chiefs | 0 | |
| Cowboys | 0 | |
| Raiders | 0 | |
| Total | 1 | |
| Which basketball team do you like? | Number of Responses | Percentage |
| Bulls | 1 | 100% |
| Lakers | 0 | |
| Total | 1 | |
| Which baseball team do you like? | Number of Responses | Percentage |
| Giants | 1 | 100% |
| A's | 0 | |
| Mets | 0 | |
| Yankees | 0 | |
| Total | 1 | |
| Cars | | |
| Which sports car is best? | Number of Responses | Percentage |
| Porche | 1 | 100% |
| BMW | 0 | |
| Ferrari | 0 | |
| Lotus | 0 | |
| Masarati | 0 | |
| Total | 1 | |
| Which SUV is best? | Number of Responses | Percentage |
| Toyota | 1 | 100% |
| Chevrolet | 0 | |
| Ford | 0 | |
| Land Rover | 0 | |
| Total | 1 | |
| Which minivan is best? | Number of Responses | Percentage |
| Mazda | 1 | 100% |
| Dodge | 0 | |
| Nissan | 0 | |
| Toyota | 0 | |
| Total | 1 | |

Question List

The following are the questions you have entered. Use the controls on the left to edit, delete, or reorder questions.

General

- 1) How do I change a flat tire on my car?
- 2) How do I change the spark plugs?
- 3) What is the best car?
- 4) Which sports car is best?

2310

2360

---

Edit FAQ: How-to tips

Overview — FAQ Setup — Question Creation — Question Review and Creation Confirm

Question Creation

You can create as many questions as you wish. For each question specify the question text in the "Question" box provided, then enter the text of the answer in the "Answer" box. Use the question list on the left to edit and reorder questions. When you have finished entering a question click "Add another" to begin a new question. Click "Next" when you have entered the last question.

Question: How do I change a flat tire on my car?

Answer:
1. Jack up the car.
2. Remove the lug-nuts from the tire.
3. Remove the flat tire.
4. Put the spare tire on the hub.
5. Tighten the lug nuts.

Type your answer above.

**\*Category:** General ( Add another question... )

( Cancel ) ( Back ) -step 3 of 4- ( Next ) ( Finish )

Question List

The following are the questions you have entered. Use the controls on the left to edit, delete, or reorder questions.

Maintenance

🗑 ✏ 1) How do I change a flat tire on my car?
🗑 ✏ 2) How do I change the spark plugs?

Picking a Car

🗑 ✏ 1) What is the best car?
🗑 ✏ 2) Which sports car is best?
　　2310
　2310

---

Edit FAQ: How-to tips

Overview ─── FAQ Setup ─── Question Creation ─── Question Review and Creation Confirm

Question Creation

You can create as many questions as you wish. For each question specify the question text in the "Question" box provided, then enter the text of the answer in the "Answer" box. Use the question list on the left to edit and reorder questions. When you have finished entering a question click "Add another" to begin a new question. Click "Next" when you have entered the last question.

Question: [How do I change a flat tire on my car?]

Answer:  1. Jack up the car.
         2. Remove the lug-nuts from the tire.
         3. Remove the flat tire.
         4. Put the spare tire on the hub.
         5. Tighten the lug nuts.

Type your answer above.

*Category: [Maintenance ▼]

[Add another question...]

(Cancel) (Back)-step 3 of 4-(Next) (Finish)

| | Welcome Thomas    🌐   ⓘ   ❓ |
| --- | --- |
| | Navigator Home Help |

Edit Page Customize Account Info Logout

/   /   /   /Apps/

| How-to tips | Customize |
| --- | --- |
| Welcome to the How-to tips FAQ. These articles will show you how to maintain your car. ||
| Maintenance ||
| How do I change the spark plugs?<br>  1. Open the hood of your car.<br>  2. Remove the spark plug wires.<br>  3. Use a spark plug wrench to remove the old spark plugs.<br>  4. Install the new spark plugs.<br>  5. Close the hood.<br>How do I change a flat tire on my car?<br>  1. Jack up the car.<br>  2. Remove the lug-nuts from the tire.<br>  3. Remove the flat tire.<br>  4. Put the spare tire on the hub.<br>  5. Tighten the lug nuts. ||
| Picking a Car ||
| What is the best car?<br>  Toyota<br>  Honda<br>  Nissan<br>Which sports car is best?<br>  Ferrari<br>  Porche<br>  Jaguar<br>  Masarati ||
| Thanks for using the How-to tips FAQ ||

*FIG. 25B*

METHOD AND MECHANISM FOR A WEB BASED KNOWLEDGE MANAGEMENT TOOL

The following applications are related: application Ser. No. 10/152,972 filed on May 21, 2002 titled Method And Mechanism For Managing Web Content Through a Web Browser; application Ser. No. 10/040,031 filed on Dec. 31, 2001 titled Methods And System For Portal Web Site Generation; application Ser. No. 10/071,260 filed on Feb. 7, 2002 titled Method And System For Distributed Formula Management; application Ser. No. 10/141,583 filed on May 7, 2002 titled Method And Mechanism For A Portal Website Architecture; application Ser. No. 10/141,485 filed on May 7, 2002 titled Method And Mechanism For A Portal Website Architecture; application Ser. No. 10/082,939 filed on Feb. 25, 2002 titled Method And Mechanism For A Portal Website Architecture; application Ser. No. 09/167,092 filed on Oct. 5, 1998, now U.S. Pat. No. 6,487,552 issued Nov. 26, 2002 titled Database Fine-Grained Access Control; application Ser. No. 09/812,896 filed on May 31, 2001; application Ser. No. 10/071,260 filed on Feb. 7, 2002 titled Method And System For Distributed Formula Management; application Ser. No. 09/540,092 filed on Mar. 31, 2000 now U.S. Pat. No. 6,745,238 issued Jun. 1, 2004 titled Self Service System For Web Site Publishing; and application Ser. No. 09/540,977, filed on May 31, 2000.

COPYRIGHT NOTICE

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

FIELD OF THE INVENTION

The invention generally relates to the field of portal websites.

BACKGROUND AND SUMMARY OF THE INVENTION

Generally, a web site is an arrangement of content, e.g., text, images, and sound, on a set of web pages configured for presentation over a computer network in a predetermined way. The content appearing on a web page is generally stored in a centralized location, such as, e.g., a database or a set of files, that is local to a web server. Requests for web pages, which are typically transmitted by web browsers via the HTTP protocol, are processed by the web server. Centralizing the storage of the content found on web pages facilitates its transmission by the web server because the web content is in a known location that is readily available.

Web sites have become more complex as their application has spread. Web sites have proven to be a valuable means of communication both with the public (e.g., a corporate web site) and in private use (i.e., an Intranet site). In either case, it is advantageous to display content with as much breadth and depth as possible to maximize the utility of the web site to its users. However, as web content becomes more complex and diverse, the amount of time, money, and effort spent in obtaining, storing, and updating the web content has increased.

More recently, portal web sites have been used to deliver complex and diverse content over a computer network. A portal web site is a web site containing one or more portlets displayed on a web page. A portlet is a configurable content area displayable on a web page that displays content obtained from a source local to or remote from the web server, or performs one or more functions local to or remote from the web server. For example, a portal web site may use an arrangement of portlets to display web content on different subject areas. The web content for each of the subject areas need not be stored centrally to the web server, but rather may be stored in a plurality of locations geographically removed, but accessible to the portal web server. A portlet may be configured such that it may display the information it obtains to the web browser in a customized manner.

An existing problem with this approach is that developing portal web sites still requires a significant investment of time, money, and effort. The effort in creating a mechanism for users to interact in a customized manner with individual knowledge bases or sets of information through portal web sites requires significant resources and time. However, even after such resources are expended, the interface may not be flexible, and therefore, not accommodating to the changing needs of the operator.

Accordingly, the present invention provides an improved method and mechanism for deploying a knowledge management tool over a worldwide computer network. In an embodiment, a first portlet is displayed to a first user through a first web browser associated with the first user. Next, information identifying an appearance and operation of a survey from the first user is received. Thereafter, the information identifying the appearance and operation of the survey is stored in a database operatively connected to a portal database server. A second portlet is displayed to a second user through a second web browser associated with the second user. Subsequently, the survey is displayed to the second user through the second portlet. Further details of aspects, objects, and advantages of the invention are described below in the detailed description, drawings, and claims.

BRIEF DESCRIPTION OF DRAWINGS(S)

The present invention is illustrated by way of example, and not by way of limitation, in the figures of the accompanying drawings and in which like reference numerals refer to similar elements and in which.

Figure 3:
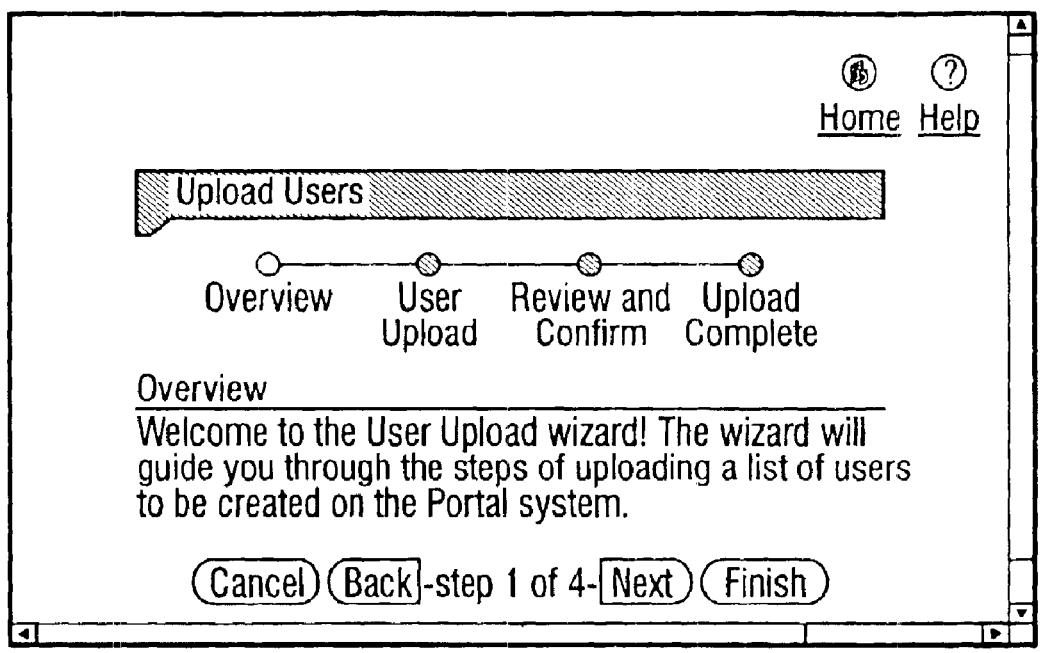
Figure 4:
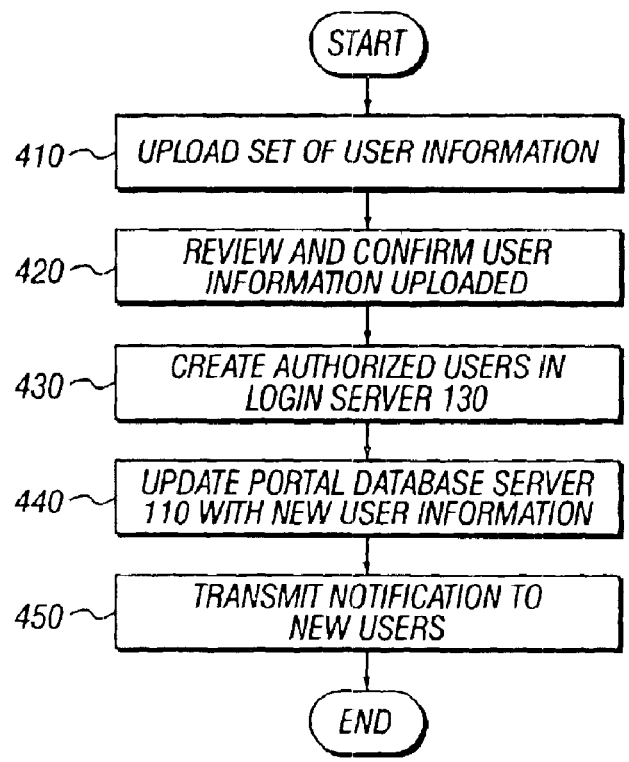
Figure 5:
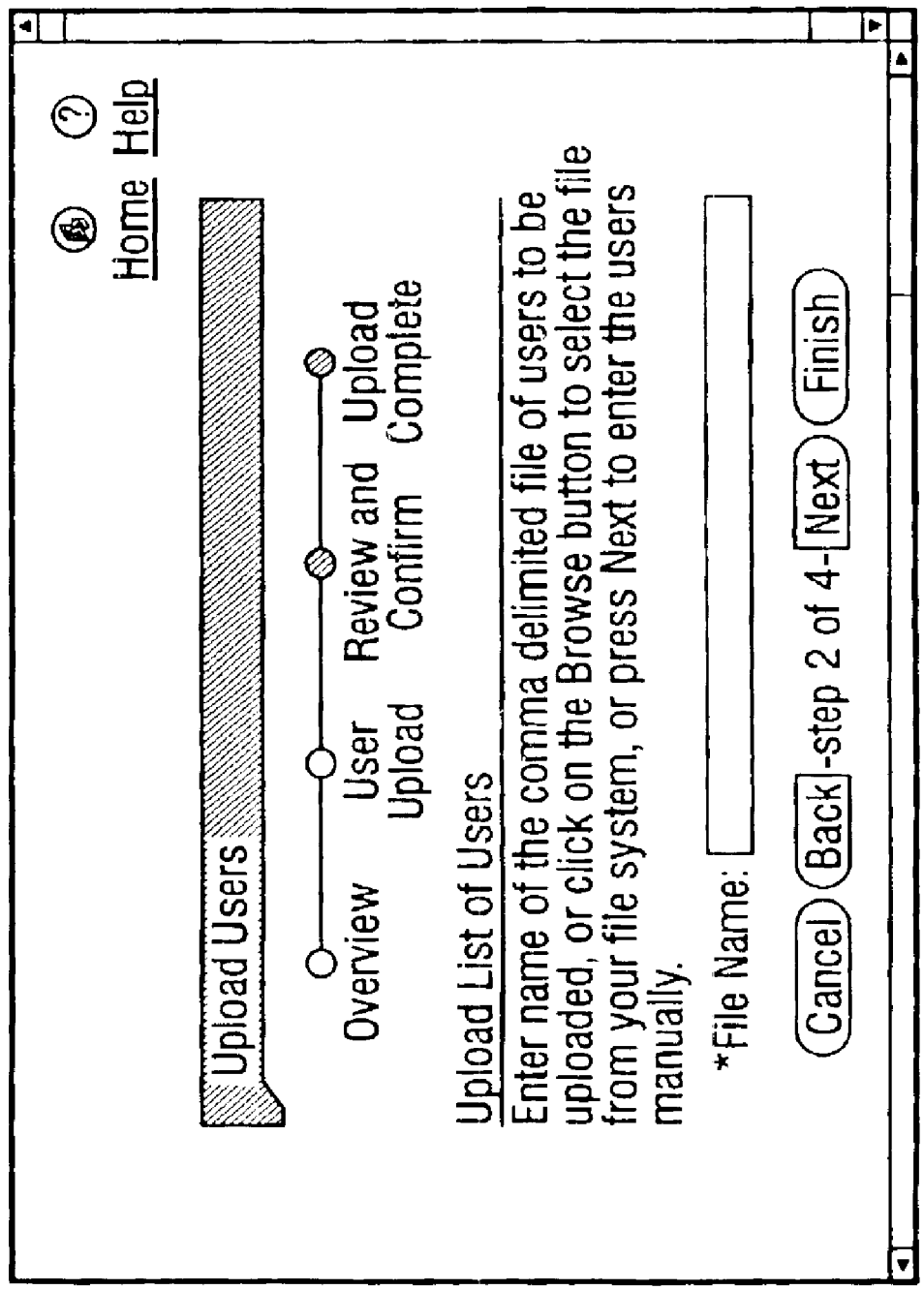
Figure 8:
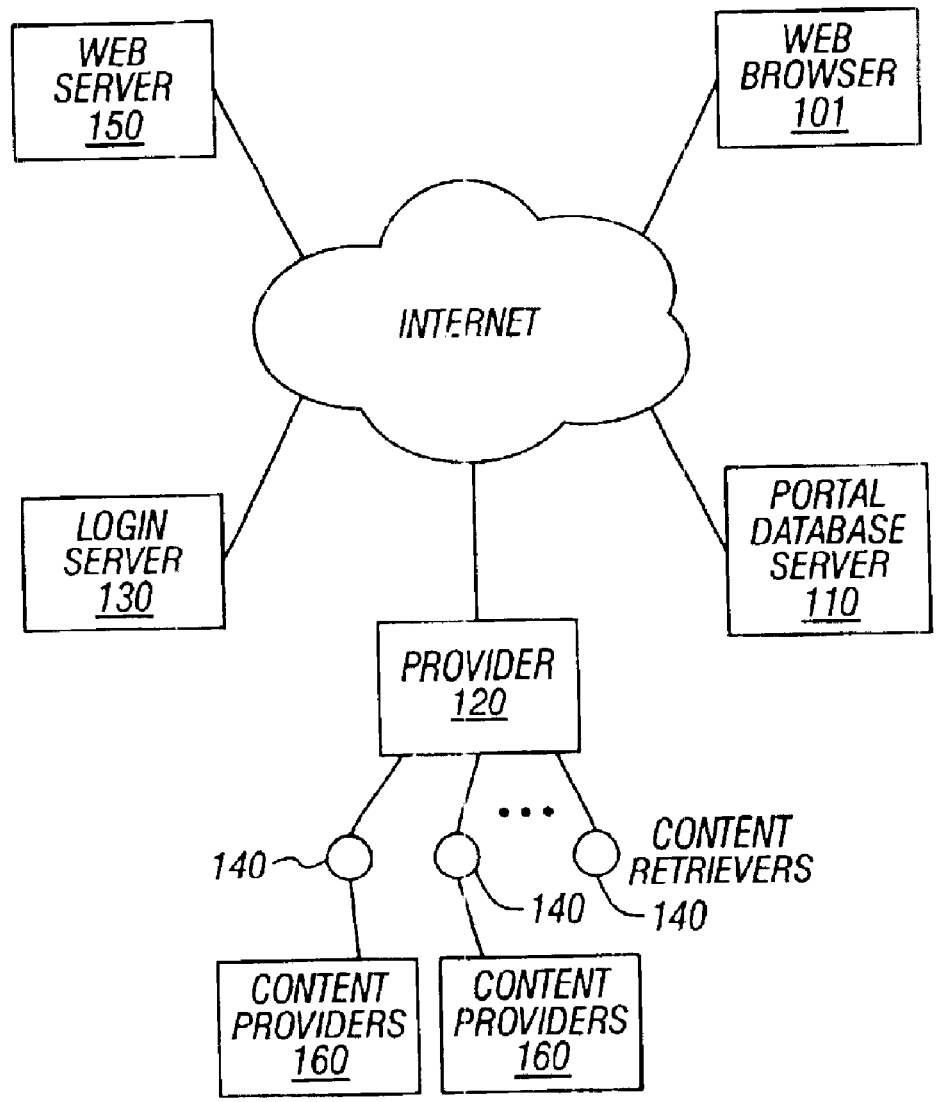
Figure 9:
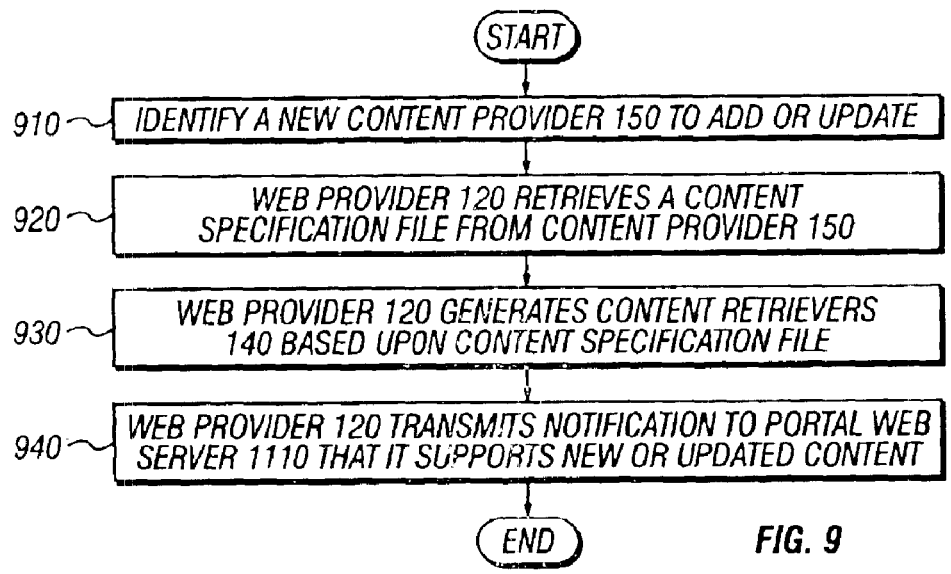
Figure 10:
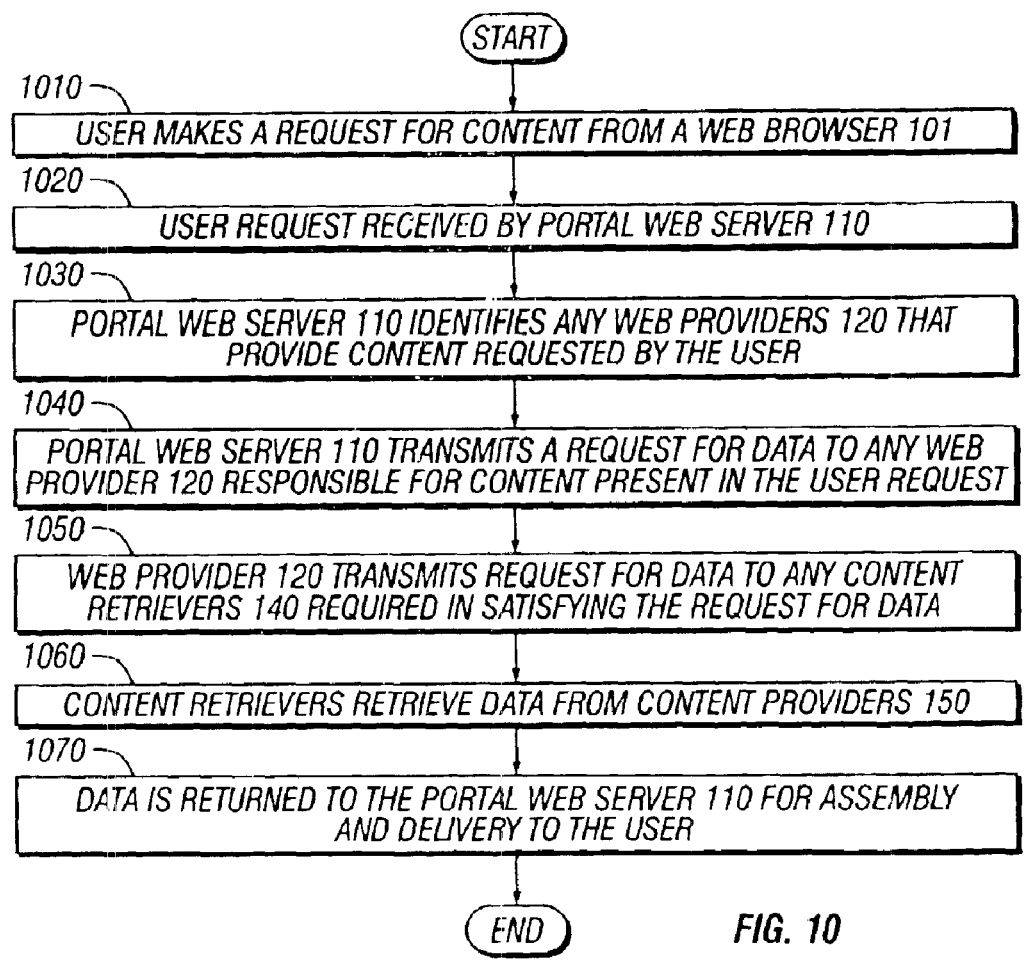
Figure 11:
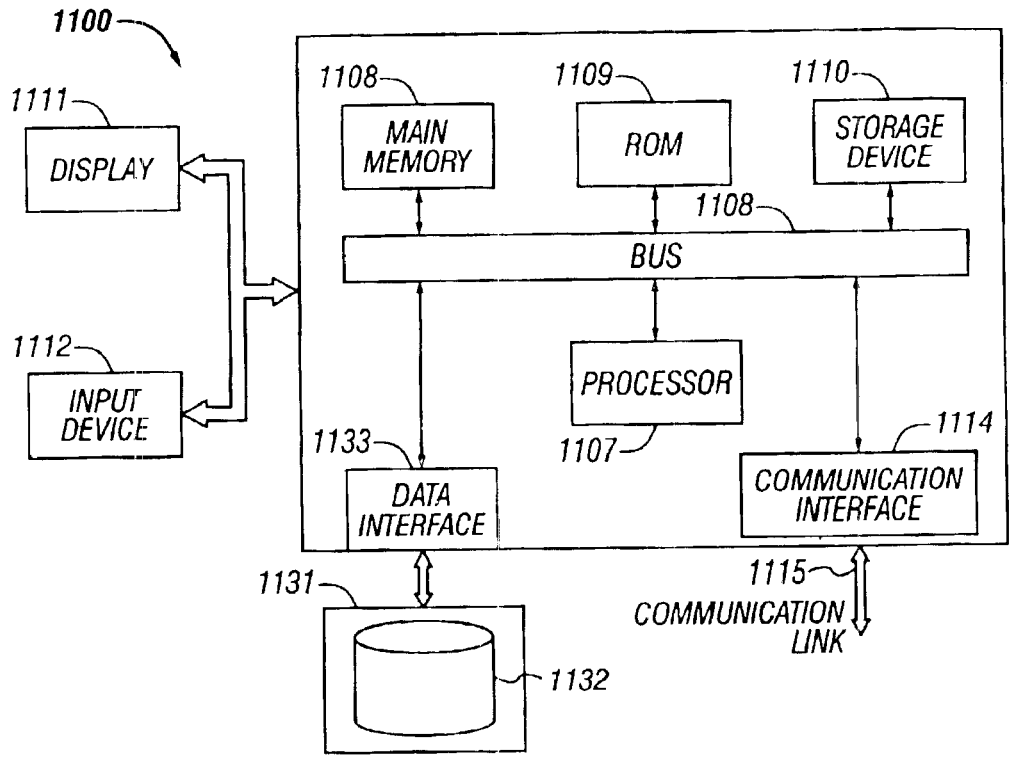
Figure 12:
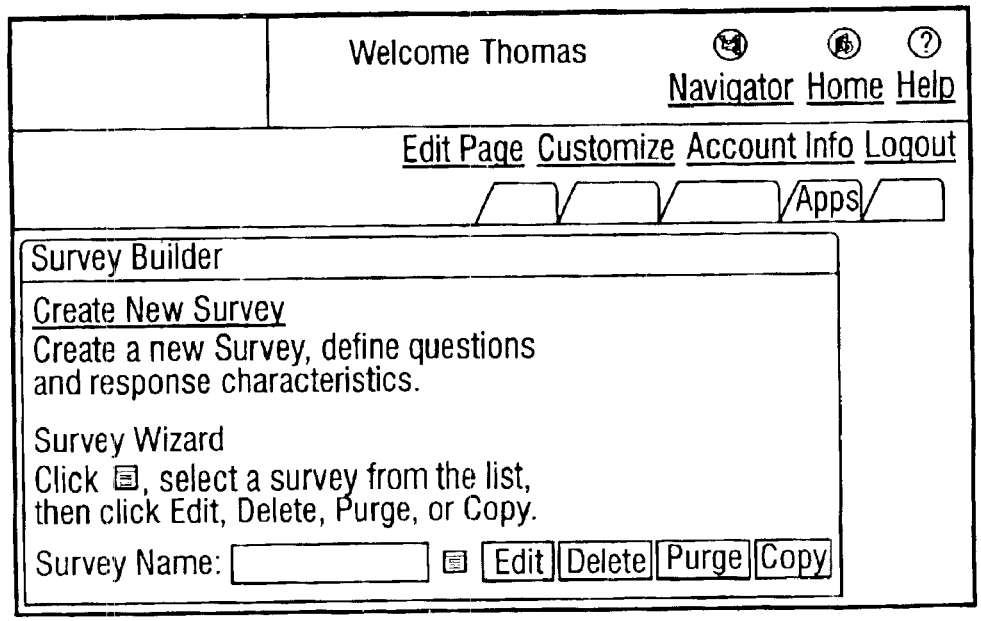
Figure 13:
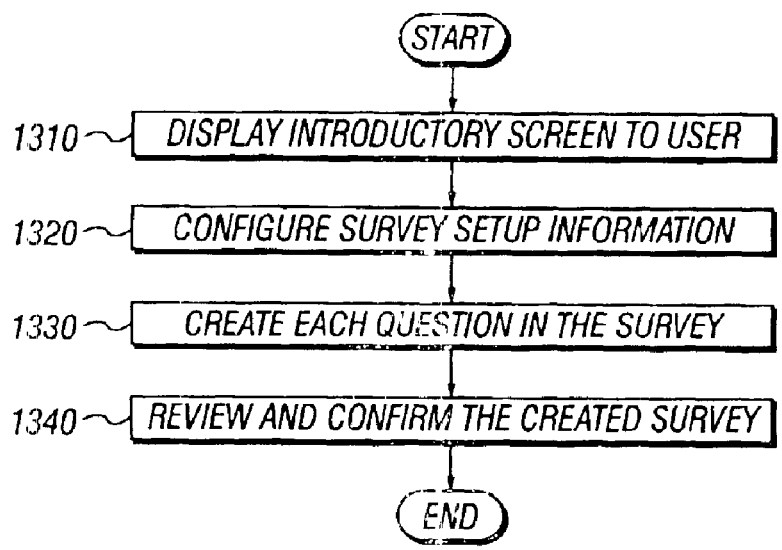
Figure 14:
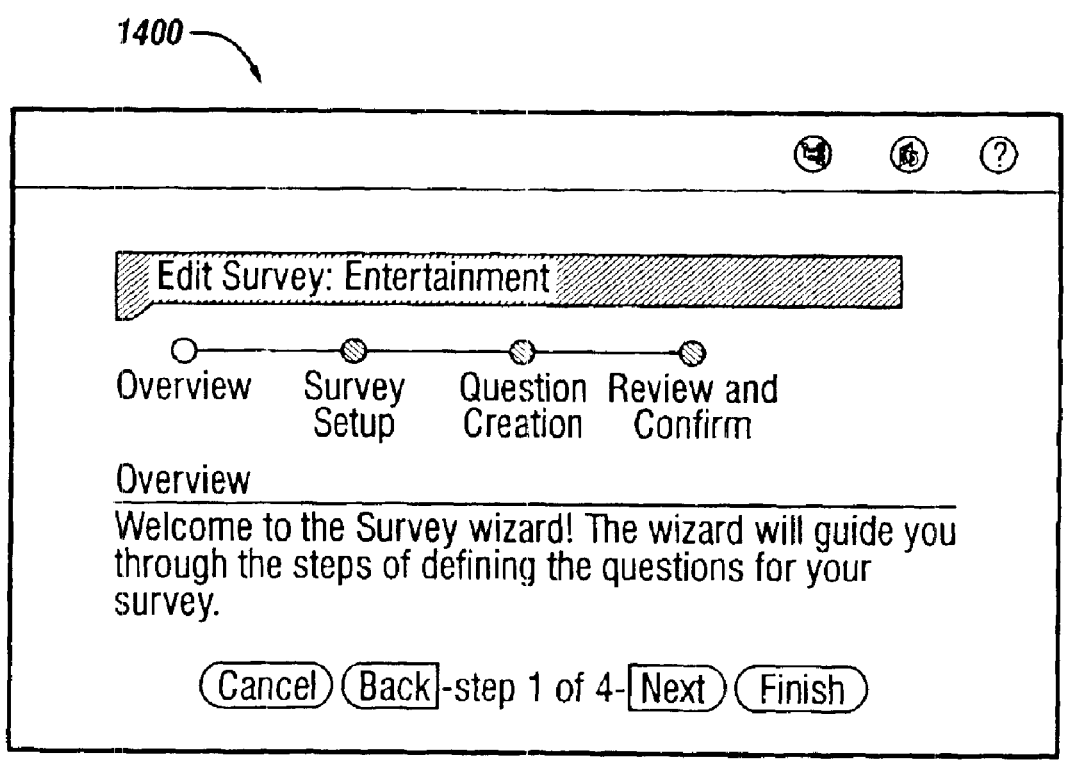
Figure 15A:
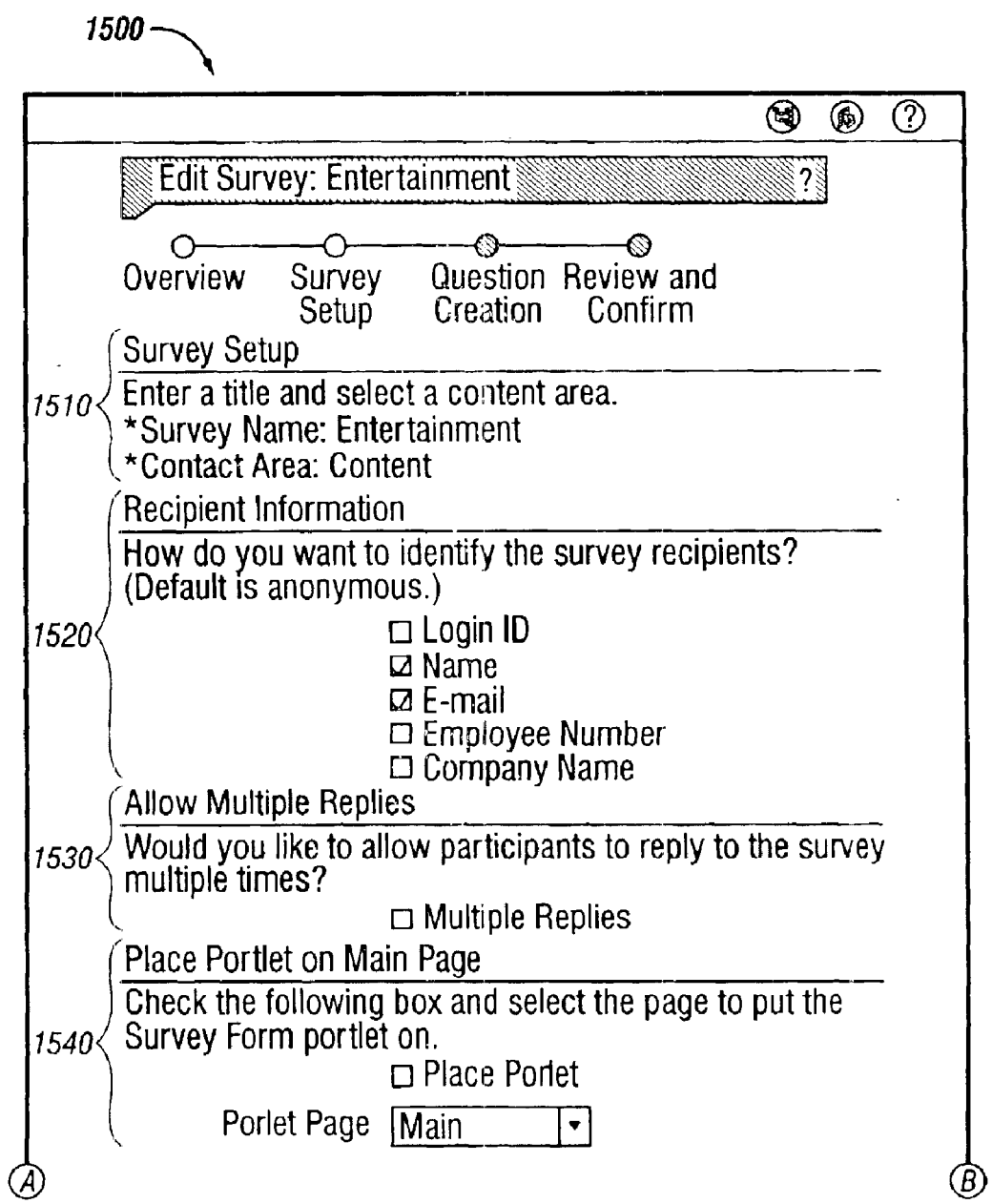
Figure 20:
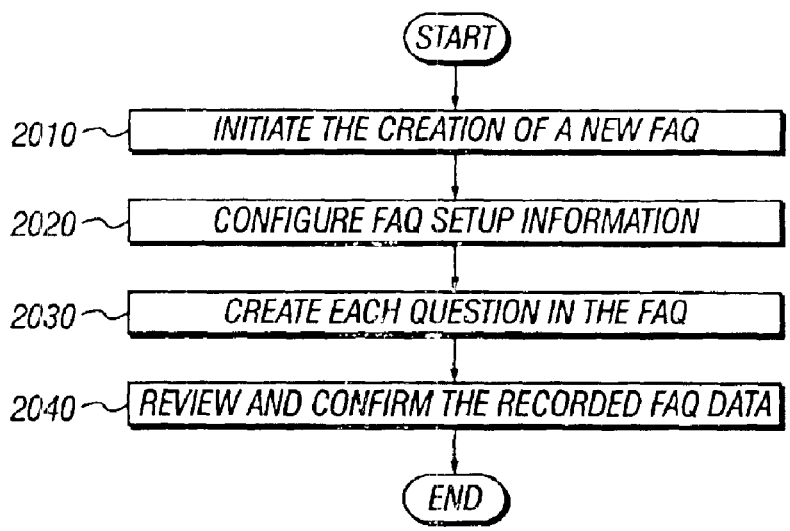
Figure 21:
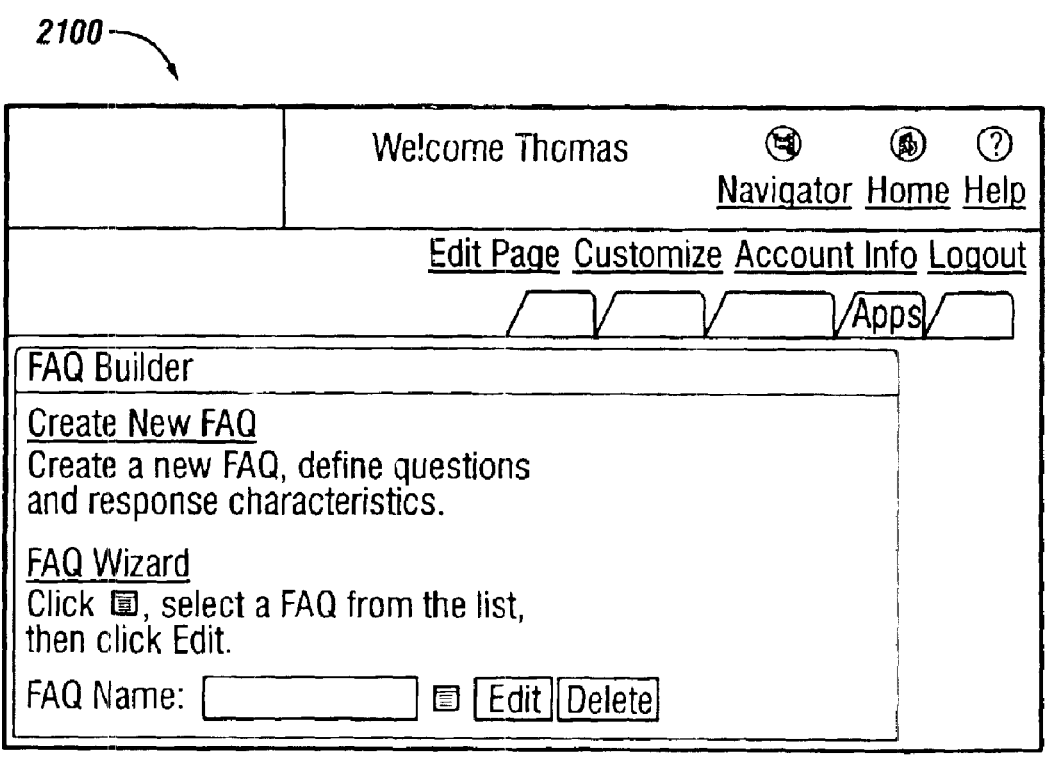
Figure 24:
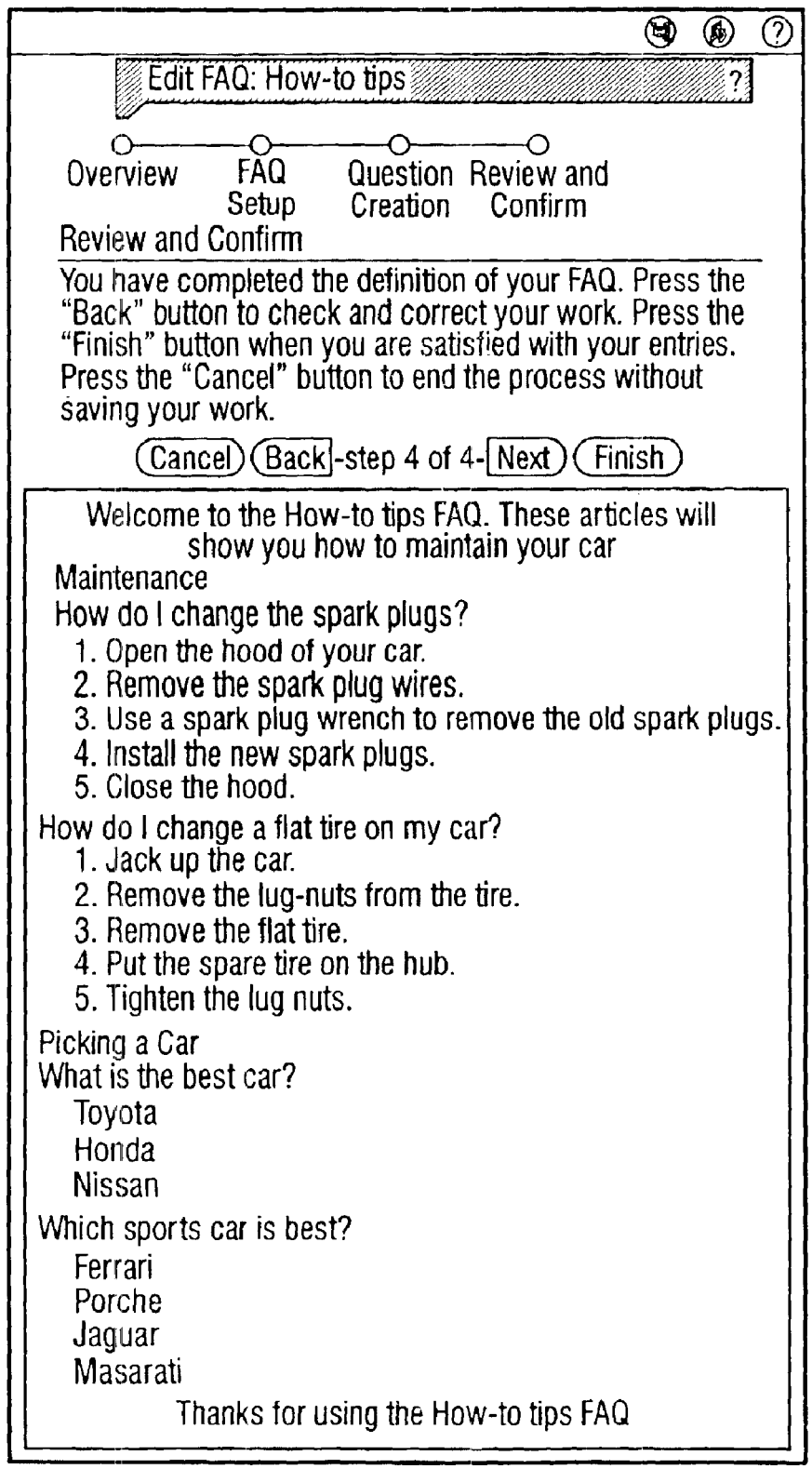

FIG. 3, which is a introductory graphical user interface for loading multiple authorized users to the portal management system 100 according to an embodiment of the invention;

FIG. 4 is a flow chart illustrating the functional steps of adding multiple authorized users to the portal management system 100 according to an embodiment of the invention;

FIG. 5 is a graphical user interface for uploading a file containing authorized user information according to an embodiment of the invention;

FIG. 6 is a graphical illustration of a interface used to review and confirm authorized user information according to an embodiment of the invention;

FIG. 7 is a graphical illustration of a web page showing the results of adding multiple users to the portal management system 100 according to an embodiment of the invention;

FIG. 8 is a pictorial representation illustrating the functional components of a portal management system 100 incorporating content from content providers according to an embodiment of the invention;

FIG. 9 is a flow chart illustrating the operational flow of adding a new content provider 160 or updating the capabilities of an existing content provider 160 in the portal management system 100 according to an embodiment of the invention;

FIG. 10 is a flow chart illustrating the functional steps of obtaining content from a content provider 160 according to an embodiment of the invention;

FIG. 11 is a block diagram of the functional components of a computer system 1100 according to an embodiment of the invention;

FIG. 12 is a pictorial representation of a portlet through which a new survey may be created, or alternately, an existing survey may be selected, and subsequently edited, deleted, purged, or copied according to an embodiment of the invention;

FIG. 13 is a flow chart that depicts the functional steps of creating a new survey according to an embodiment of the invention;

FIG. 14 is a pictorial representation of an introductory screen in creating a new survey according to an embodiment of the invention;

FIGS. 15A and 15B are pictorial representations of a survey builder portlet 1500 according to an embodiment of the invention;

FIG. 16 is a pictorial representation of a graphical user interface through which creation of each question in the survey may be performed according to an embodiment of the invention;

FIG. 17 is a pictorial representation of a review and confirm user interface 1700 according to an embodiment of the invention;

FIG. 18A is a pictorial representation of a survey answer form customization portlet 1800 according to an embodiment of the invention;

FIG. 18B is a graphical illustration of a portion of a survey according to an embodiment of the invention;

FIG. 19A is a pictorial representation of a report configuration portlet 1900 according to an embodiment of the invention;

FIGS. 19B and 19C are pictorial representations of an illustrative report 1950 generated suing the report portlet 1900 according to an embodiment of the invention;

FIG. 20 is a flow chart illustrating the sequence of steps in creating a FAQ with a FAQ builder portlet 2100 according to an embodiment of the invention;

FIG. 21 is a pictorial representation of a FAQ builder portlet 2100 according to an embodiment of the invention;

Figure 22:
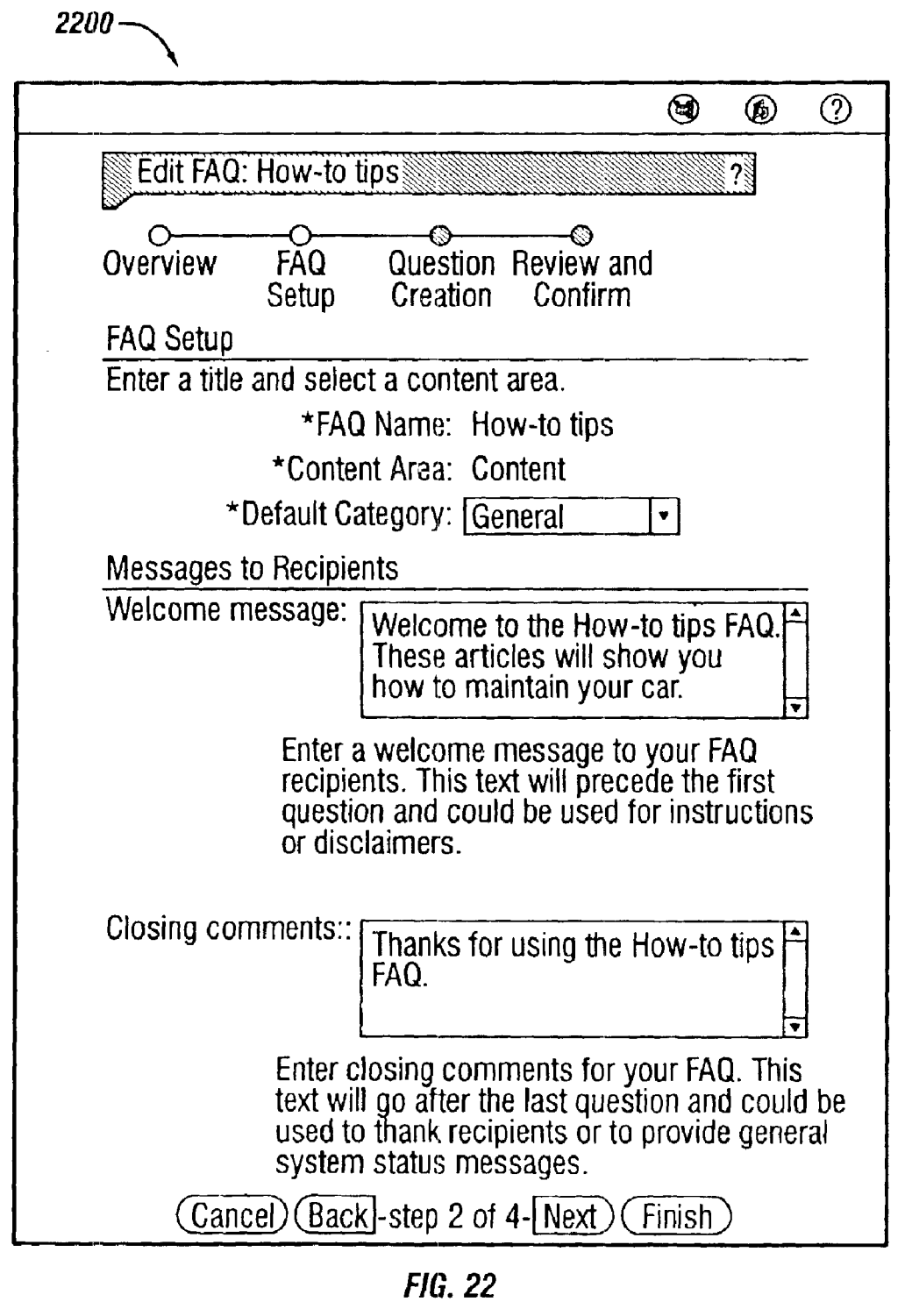

FIG. 22 is a pictorial representation of a portlet 2200 through which FAQ setup information may be configured according to an embodiment of the invention;

FIGS. 23A and 23B are pictorial representation of a portlet through which questions may be created in a FAQ according to an embodiment of the invention;

FIG. 24 is a pictorial representation of a portlet 2400 through which the recorded FAQ data may be reviewed and confirmed according to an embodiment of the invention;

Figure 25A:
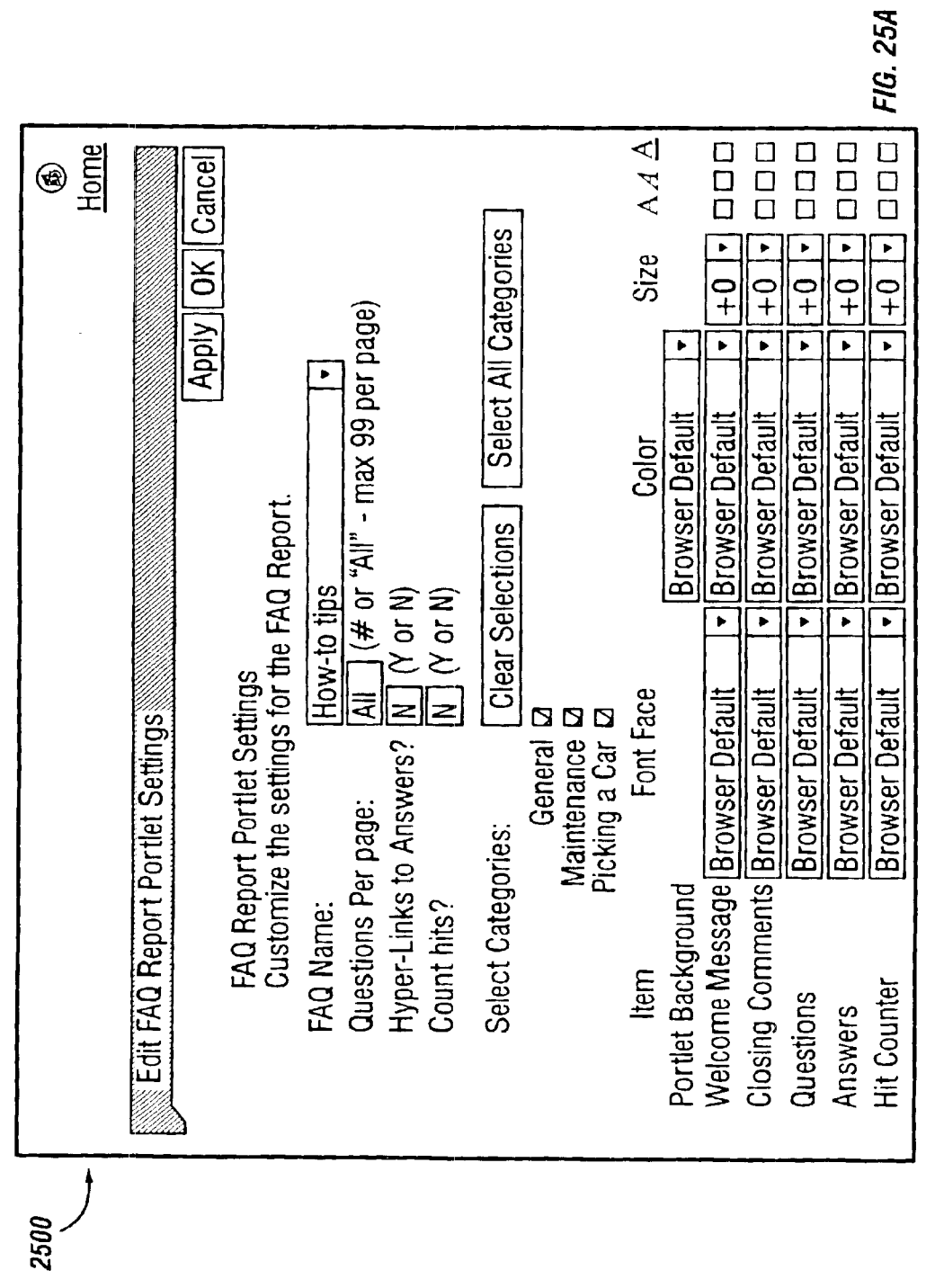

FIG. 25A is a pictorial representation of a FAQ presentation configuration portlet 2500 according to an embodiment of the invention; and FIG. 25B is a graphical illustration of a FAQ presentation portlet 2550 according to an embodiment of the invention.

DETAILED DESCRIPTION OF EMBODIMENT(S)

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

A user, as used within, refers to any person or computing entity that receives or consumes content from the portal management system 100. In other words, a user may be a human being or a computer program. A group, as used herein, is a set of users who may be collectively assigned certain access permissions to portions of a portal web site. An administrator, as used herein, refers to any person that manages the operation of the portal management system 100. Content, as used herein, refers to any information displayable on a web page, such as text, images, or sound files.

I. Functional Overview

Figure 1:
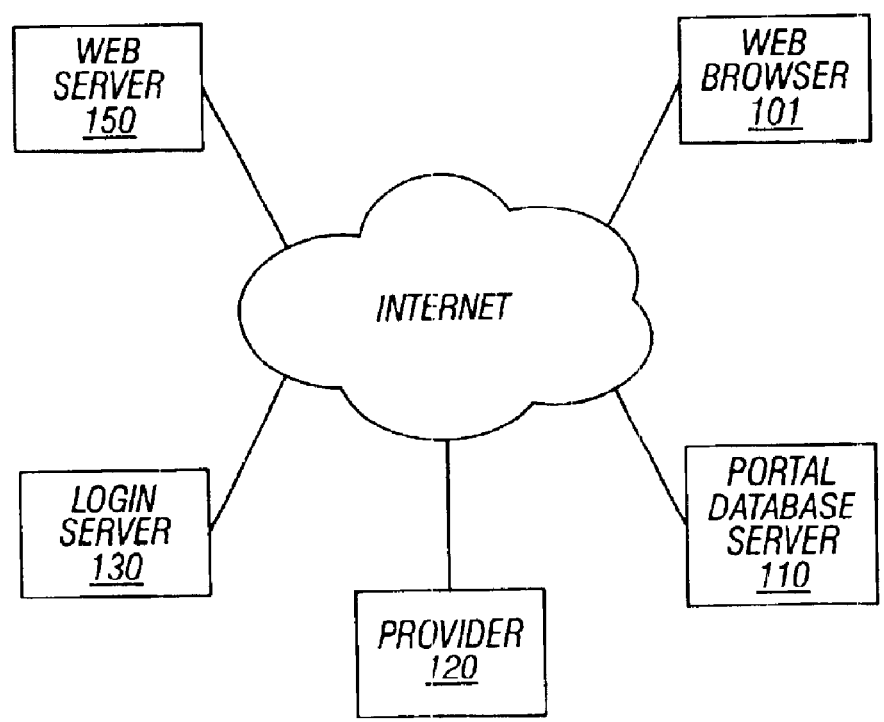
FIG. 1 is a pictorial representation illustrating the functional components of a portal management system 100 according to an embodiment of the invention.

FIG. 1 is a pictorial representation illustrating the functional components of a portal management system 100 according to an embodiment of the invention. According to an embodiment of the invention, the portal management system 100 allows a user to manage portal web sites and the content appearing thereon. The portal management system 100 includes a web browser 101, a portal database server 110, a provider 120, and a web server 150. In embodiments of the invention, the portal management system 100 may also include a login server 130.

A web browser 101 is any device capable of browsing content over a worldwide computer network, such as the Internet, and is operatively connected to the web server 150. While only one web browser 101 is shown in FIG. 1, multiple web browsers 101 may be operatively connected to the web server 150. A web server 150 is a well understood component having a process running at a web site that transmits web pages in response to HTTP requests from web browsers 101. The web browser 101 and the web server 150 may communicate over a worldwide computer network using well-known communication protocols, such as TCP/IP, HTTP, and XML. In an embodiment, the web server 150 is implemented using the 9iApplication Server available from Oracle Corporation, located in Redwood Shores, Calif.

A portal database server 110 is a server that provides content pertaining to a portal web site to one or more web browsers 101. In an embodiment, the portal database server 110 is implemented using the Oracle 9iAS Portal available from Oracle Corporation, located in Redwood Shores, Calif. The portal database server 110 is operatively connected to the web server 150 and may be operatively connected to one or more providers 120.

A portal web site is a web site containing one or more portlets displayed on a web page. A portlet is a configurable content area displayable on a web page that displays content obtained from a source local to or remote from the web server, or performs one or more functions local to or remote from the web server. A portlet may be configured such that it may display the information it obtains to the web browser in a customized manner.

A provider 120 is a functional component, typically a software system executing on a hardware device, that provides content for a portlet in response to requests from the portal database server 110. A provider 120 may, although it need not, operate on a separate hardware device other than that executing the portal database server 110. In some embodiments, the provider 120 may be implemented using a cross-platform component architecture, e.g., the Java-Bean™ architecture from Sun Microsystems, Inc., located in Palo Alto, Calif. Such an embodiment is advantageous when deploying over multiple platforms or in a location external to the portal database server 110. In other embodiments of the invention, the provider 120 may be implemented using one or more PL/SQL packages or stored procedures. Such an embodiment may be advantageous when the content the provider 120 is responsible for resides in the same or similar schema as used by the portal database server 110.

A login server 130 is a standard software component which verifies and authorizes the identities of users. A user accessing the portal management system 100 may need to obtain authorization from the login server 130 prior to substantial use of the portal management system 100. In an embodiment, the user may obtain authorization from the login server 130 by transmitting information related to their identity to the portal database server 110, which is subsequently transmitted to the login server 130 for verification. Once a user is authenticated by the login server 130, a user identifier, which is information that uniquely identifies the user, may be assigned by the login server 130. The user identifier may accompany all transmissions from the user. As the identity of the user may be ascertained from his transmissions by his user identifier, the state of the portal management system 100 for that user may be preserved. For example, in an embodiment, as the state of the portal management system 100 is preserved for each user, a home page or default configuration for a user may, by default, be initially displayed by the portal database server 110. In an embodiment, the login server 130 may be implemented using the Single Sign-on Server, available from Oracle Corporation, located in Redwood Shores, Calif.

In embodiments of the invention, the portal database server 110, provider 120, and the login server 130 may each be operatively connected to one or more databases (not shown in FIG. 1) to enable the portal database server 110, provider 120, and the login server 130 to store, manage, and retrieve data. A database is a standard software component for storing, managing, and retrieving data, and includes the plurality of databases known to those in the art, such as, e.g., the Oracle 8i database, available from Oracle Corporation, located in Redwood Shores, Calif. While those skilled in the art recognize that data stored in a single database may be stored across multiple databases, and vice-versa, for ease of explanation the present invention shall be described such that the portal database server 110, provider 120, and login server 130 are operatively connected to individual databases. However, the present invention is not limited to any particular arrangement of databases. Embodiments of the invention include the use of backup or failover databases or disc arrangements, such as in a RAID arrangement, to promote uninterrupted operability of the database.

In embodiments of the invention, the database stores information about groups of related users in different database schemas. In other embodiments, the database stores information about related groups of users using the same database schema. Access is restricted in the database schema such that users may only access information-pertinent to their associated group. In some embodiments, this is performed using a virtual private database ("VPD"), which is a feature of the Oracle 8i database available from Oracle Corporation, located in Redwood Shores, Calif. This feature is described in patent application Ser. No. 09/167,092, filed on Oct. 5, 1998, and in patent application Ser. No. 09/812, 896, filed on May 31, 2001, each of which are assigned to the assignee of the present application and each are hereby incorporated herein by reference. Other embodiments of the invention may perform the function of restricting access to rows in a database table by the user through a variety of other methods, such as, e.g., using a database view or the use of a session table. In order to prevent unnecessarily obscuring the description of the present invention, embodiments of the invention shall store information about multiple users of the portal management system 100 in the same schema in the database, but will restrict access such that a user may only access information stored in the database authorized to that user. Embodiments of the invention may use any of the aforementioned mechanisms to restrict access on the database schema by, for example, associating a subscriber identifier with each user. A subscriber identifier is a unique identifier for a set of users. For example, a company may be assigned the same subscriber identifier. All users of the company in the example may have a different user identifier, but may have the same subscriber identifier. By associating a subscriber identifier with each user, access to a database may be restricted using the techniques discussed above.

For the sake of clarity and brevity, only one portal database server 110, provider 120, and login server 130 are depicted. Those skilled in the art shall recognize that for a variety of reasons, including scalability and performance, multiple portal web servers 110, providers 120, and login servers 130 may be used. Accordingly, the invention is not limited to any particular number or arrangement of functional components, such as portal web servers 110, providers 120, and login servers 130 within the portal management system 110.

Figure 2:
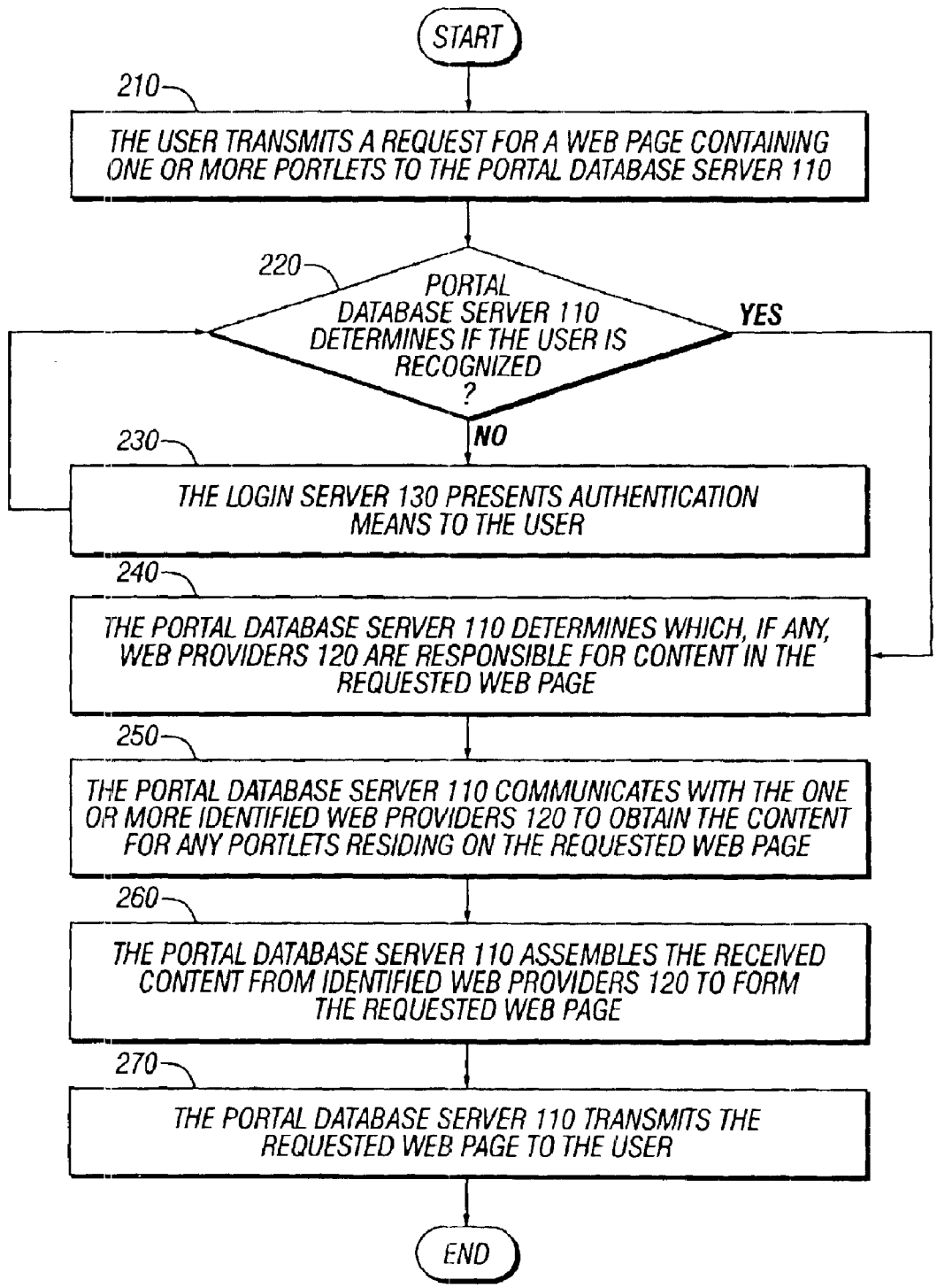
FIG. 2 is a flow chart illustrating the steps in the operational flow of requesting content through the portal management system 100 according to an embodiment of the invention.

The operational flow of requesting content through the portal management system 100 will be presented with reference to FIG. 2, which is a flow chart illustrating the same according to an embodiment of the invention. In an embodiment, initially, in step 210, the user transmits a request for a web page containing one or more portlets to the portal database server 110. The request may be sent by the user through a web browser 101 associated with the user. In an embodiment, a web server 150 may receive the request from the user, and transmit the request to the portal database server 110 for processing. Subsequently, the portal database server 110 determines in step 220 if the user is recognized (i.e., "logged in"). This may be accomplished by examining an associated user identifier accompanying the user request. If the user is not recognized by the portal database server 110, then the portal database server 110 may request the login server 130 to provide authentication means to the user so that the user may authenticate him or herself in step 230. Such means may include a web page where the user may submit information regarding their identity, such as a username and password. Subsequently, the identifying information may be transmitted to the login server 130 for verification. The login server 130 may, upon receiving the identifying information, verify the user's identity with information stored about the user in a database associated with the login server 130. Thereafter, the login server 130 may transmit the results of the verification to the portal database server 110. In embodiments, the user may be given a predetermined number of opportunities to authenticate him or herself before the portal management system 100 disables the user's account within the portal management system 100. If the user is recognized by the portal database server 10, then operation proceeds to step 240.

In an embodiment, in step 240, the portal database server 110 determines which, if any, providers 120 are responsible for content in the requested web page. For example, if a requested web page has two portlets displayed on it, each provider 120 that supports one of the two portlets on that requested web page may be identified. In an embodiment, after determining which providers 120 are responsible for content, the portal database server 110 communicates with the one or more identified providers 120 to obtain content for any portlets residing on the requested web page in step 250. Upon receiving the request, the providers 120 parse the request, fulfill the request, and transmit the information satisfying the request to the portal database server 110. For example, a provider 120 may provide functionality regarding formula management. If a request is received by that provider 120 to retrieve a particular formula, then the web provider fulfills the request by retrieving the requested formula, and transmitting the formula to the portal database server 110. This example is described in further detail in United States patent application entitled Method and System for Distributed Formula Management, filed on Feb. 7, 2002, which is assigned to Oracle Corporation of Redwood Shores, Calif., and is incorporated herein by reference.

In an embodiment, subsequently, the portal database server 110 assembles the received content from the identified providers 120 to form the requested web page 260. As discussed in further detailed below, the portal database server 110 assembles the content to form the requested web page by merging data received from providers 120 and data stored in an associated central repository concerning the organization and presentation of the web page. Thereafter, in an embodiment, the portal database server 110 transmits the requested web page to the user in step 270. In embodiments, the portal database server 110 may transmit the requested web page to the web server 150, which may in turn transmit the web page to the user. The user typically receives and renders the requested web page from the web server 150 in an associated web browser 101. The process depicted in FIG. 2 may be repeated if the user requests an additional web page. In an embodiment, the portal database server 110 may periodically transmit updated information about a particular portlet to a web browser 101 without receiving an explicit user request to do so, if the portal database server 110 previously transmitted information to the web browser 101 about that portlet, and the portal database server 110 received notification that a more current set of information for that portlet is available. For example, if a user loaded a world news portlet in their web browser 101, the world news displayed in the portlet may be updated by the portal database server 110 when notification is received by the portal database server 110 that updated information becomes available. Such notification regarding the relative freshness of the data may be stored in the portal database server 110, or may be received periodically from the provider 120.

II. Assembling Content at Portal Database Server

In an embodiment, the portal database server 110 stores information regarding the composition of a web page with one or more portlets displayed thereon in a central repository, such as a database. Aspects of the invention directed towards storing information in a central repository are detailed in U.S. patent application Ser. No. 09/540,092, filed on Mar. 31, 2000, U.S. patent application Ser. No. 09/540,977, filed on Mar. 31, 2000, both of which are assigned to the assignee of the present invention and both of which are incorporated herein by reference.

The portal database server 110 assembles the requested web page using any content received from providers 120 and data stored in an associated central repository concerning the organization and presentation of the web page. In an embodiment, the data stored in the central repository that the portal database server 110 uses in assembling the requested web page includes data concerning the following attributes of the web page: style, layout, content resident thereon, portlets displayed thereon, items displayed thereon, groups, folders, and user permissions for the web page. In other words, the portal database server 110 manages data concerning the appearance and operation of portal web sites in a central repository, such as a database, and uses that information to assemble the web page, along with content received from providers 120. The data the portal database server 110 uses in rendering web pages may be directed towards visual aspects of the page, e.g., style or layout information, or it may be directed towards operational aspects of the page, e.g., what portlets are displayed, permissions regarding access to portions of the web page. Accordingly, in an embodiment, the portal database server 110 manages user permissions regarding the content displayed on the portal web site. Said differently, users may be assigned permission levels to restrict their access to content at multiple levels of granularity, e.g., web pages, folders, portlets, and individual items on a web page.

III. Loading Users

In embodiments of the invention, users may need to be authorized by the portal management system 100 to obtain access to certain content or web pages. In such embodiments, the portal management system 100 maintains a list of authorized users to such content or web pages. Typically, the login server 130 maintains a list of authorized users, along with other associated information about each user ("user information"), such as first name, last name, email address, username, password, and company name. Such user information is used by the login server 130 to verify the identity of users. A new authorized user may be added to the login server 130 by a variety of means, such as by storing the new user information entered through a graphical user interface or by directly transmitting the new user information to be stored to a database associated with the login server 130.

Various embodiments of the invention advantageously enable multiple users to be added to the portal management system 100 contemporaneously. In an embodiment, multiple users may be added to the portal management system 100 through a graphical user interface displayable on a web page. To aid the user, the graphical user interface may display a welcome message, directions, and/or a graphical illustration of what step within the overall process the user is currently in, such as the graphical user interface displayed in FIG. 3, which is a introductory graphical user interface for loading multiple authorized users to the portal management system 100 according to an embodiment of the invention. For example, in FIG. 3, the user is presented with a welcome message, and instructed that by clicking "Next", the process of adding multiple users to the portal management system 100 shall commence.

FIG. 4 is a flow chart illustrating the functional steps of loading multiple authorized users to the portal management system 100 according to an embodiment of the invention. In the first step 410, according to an embodiment, a set of user information for each new user is uploaded to the portal management system 100. The set of user information includes a minimal set of information necessary for the login server 130 to recognize and authenticate the user. The set of user information for all new users may be expressed in a file. The file containing the set of user information for each new user may be structured such that the portal management system 100 may parse the information within the file, e.g., the file may be a comma-delimited file. The file may be created using well-known means, such as, e.g., a spreadsheet or a standard text editing program. The file may be uploaded to the portal management system 100 using a graphical user interface, such as that displayed in FIG. 5, which is a graphical user interface for uploading a file containing authorized user information according to an embodiment of the invention. As shown in FIG. 5, the graphical user interface may be used to navigate to the location of the file containing the authorized user information and transfer it to the portal management system 100.

The portal management system 100 may use a predetermined arrangement of data in the file used in step 410. By having a predetermined arrangement, the login server 130 may determine the information type of each datum by its relative position to other data in the file. For example, in an embodiment, the file is a comma-delimited file that organized the following data types in the following order in each row: username, password, email address, a group that the user is a member of, and a default group flag which indicates whether the group previously identified is a default group for the user. A datum in the first position would be a username, a datum in the second position would be a password, and so on. The portal management system 100 may be configured to recognize any organization of data within the file, thereby accommodating different combinations and orders of user information.

In an embodiment, the next step 420 is to review and confirm the new user information. After the file is uploaded into the portal management system 100, the information contained on the file may be graphically displayed to the user to facilitate verifying its accuracy. FIG. 6 is a graphical illustration of an interface used to review and confirm authorized user information according to an embodiment of the invention. In the embodiment depicted in FIG. 6, each new user has an associated username, password, email address, group, and a default group flag which is displayed in a row in a table. The portal management system 100 may execute stored computer programs to check the uploaded user information for errors, e.g., adding a user that already exists or supplying incomplete information. If there is an error detected in the user information supplied for a user, then the error may be graphically displayed to the administrator. For example, in FIG. 6, there is an error column 610 that may display a detected error associated with a particular row of user information. In an embodiment, the administrator may edit the user information through the graphical user interface, or may delete the user information associated with the error. In an embodiment, the administrator may also add new users through the graphical user interface depicted in FIG. 6 by clicking a button to add a new row to the display, and entering the appropriate new user information. When the administrator is satisfied with the user information, he or she may confirm the information by clicking a button upon the graphical user interface, thereby initiating step 430.

As shown in FIG. 4, the next step 430 according to an embodiment is to create authorized users in the login server 130. The user information for each new user is transmitted to the login server 130, where its is stored within a database associated with the login server 130. The user information stored within a database associated with the login server 130 may be recalled thereafter by the login server 130 to verify the identities of the newly added users.

Subsequently, in an embodiment, the portal database server 110 is updated with the new user information in step 440. In an embodiment, the portal database server 10 creates components necessary to display content for users, such as, e.g., folders. Thereafter, the portal database server 10 may, in an embodiment, associate each new user with one or more groups. Note that in embodiments of the invention, step 440 and step 430 may be executed in reverse order or in parallel.

In an embodiment, the next step 450 is to transmit notification electronically to the administrator that the new users have been added to the portal management system 100. Notification may be sent to the newly added users electronically by a variety of well known means, such as, e.g., an email or a page. The results of adding multiple users contemporaneously may be graphically displayed to the administrator as well, as shown in FIG. 7, which is a graphical illustration of a web page showing the results of adding multiple users to the portal management system 100 according to an embodiment of the invention.

IV. Obtaining Content from Content Providers

FIG. 8 is a pictorial representation illustrating the functional components of a portal management system 100 incorporating content from content providers 160 according to an embodiment of the invention. FIG. 8 includes components discussed above with reference to FIG. 1, as well as content retrievers 140 and a content provider 160. A content retriever 140 is a software component that is responsible for obtaining content from a content provider 160 and transmitting the content in an understandable form to the provider 120. In an embodiment, a content retriever 140 may be constructed using JSP (Java Server Page) technology available from Sun Microsystems, located in Mountain View, Calif. A content provider 160 is any computerized source or provider of content, such as, e.g., a news agency, a magazine, or an organization. For example, a news agency such as Knight Ridder may be a content provider 160, since Knight Ridder is a communications company engaging in the distribution of news over electronic channels.

The operational flow of adding a new content provider 160 or updating the capabilities of an existing content provider 160 in the portal management system 100 shall now be described with reference to FIG. 9, which is a flow chart illustrating the same according to an embodiment of the invention. According to an embodiment, the first step 910 is to identify a new content provider 160 to add or update in the portal management system 100. In other words, in addition to identifying a new content provider 160, a content provider 160 currently existing within the portal management system 100 may be identified so that the content and features that content provider 160 supports may be updated within the portal management system 100.

After a content provider 160 is identified, a provider 120 retrieves a content specification file from the identified content provider 160 in the next step 920 according to an embodiment. The content specification file is a file that contains a description in a specific format of the content that the content provider 160 supports and information describing how to connect to the content stored at the content provider 160. The content specification file may be obtained by the provider 120 by a variety of electronic means, including, e.g., a ftp connection or a HTTP request. The content supported by a content provider 160 may by grouped into content modules, which are logical organizations of related content. For example, one content module may be directed towards the daily sports scores, while another content module may be directed towards world news. In an embodiment, the content specification file may contain information about all the content modules supported by the content provider 160. Such information may include information about how to categorize the content module, details on how to connect to the content module, any parameters supported by the content module allowing customization, and information about how often the information in the content module is updated by the content provider 160.

In an embodiment, the next step 930 is for the provider 120 to generate content retrievers 140 based upon the retrieved content specification file. In an embodiment, just prior to step 930, if the web provider has any existing content retrievers 140 associated with the content provider 160 being added or updated, then those existing content retrievers 140 are deleted in anticipation of step 930. The content retrievers 140 are generated based upon the information contained within the content specification file. In an embodiment, one content retriever 140 is generated for each content module specified within the content specification file. As the content specification file contains information on how to connect to the content modules, the content retriever 140 may be generated such that they may connect to content modules supported by the content provider 160. The content retrievers 140 are generated such that they may transmit information to the provider 120 generating them in a manner understandable to the provider 120.

Subsequently, in an embodiment, the provider 120 transmits notification to the portal database server 110 that it supports the new or updated content 940. The transmitted notification contains a description of all the new content supported by the provider 120, includes any new content modules. Thereafter, the portal web server may provide users the ability to view and access the newly added content, e.g., by adding a new portlet to their web site.

The retrieval of content by a user from a content provider 160 is facilitated by a content provider user identifier, or CPUI, which uniquely identifies each user to a particular content provider 160. Initially, in an embodiment, a CPUI is generated and maintained by the portal database server 110 for each user for each content provider 160 from which the user receives content. The CPUI may be generated by the portal database server 110 automatically, e.g., concatenating the username of the user with a randomly generated string. A user will have a CPUI for each content provider 160 from which he or she receives content. A user does not need to know the value of his associated CPUIs, as it is used internally by the portal database server 110 when serving content from content providers 160 to users. In an embodiment, a CPUI may be stored in a cookie at a web browser 101 associated with a user. In another embodiment, a CPUI may be stored in a database associated with the portal database server 110.

The operational flow of obtaining content from a content provider 160 shall now be discussed with reference to FIG. 10, which is a flow chart illustrating the functional steps of obtaining content from a content provider 160 according to an embodiment of the invention. In an embodiment, initially in step 1010, a user makes a request for content from a web browser 101. For example, a user may request a web page that displays multiple portlets from their web browser 101. Subsequently, the user request is received by the portal database server 110 in the embodiment illustrated in step 1020. Thereafter, in step 1030, the portal database server 110 identifies any providers 120 that provide content requested by the user according to an embodiment. For example, if a requested web page contains two portlets, one displaying fishing content and the other displaying regional news, then the providers 120 supporting the fishing and regional news portlets are identified by the portal database server 110. In an embodiment, in step 1030, the CPUI associated with the providers 120 supporting any requested portlets are identified.

Next, in an embodiment, the portal database server 110 transmits a request for data to any provider 120 responsible for content present in the user request 1040. The request for data is directed towards obtaining that portion of the user's original request that is supported by the provider 120. To illustrate, in the example above, only a request for fishing data will be sent to the web provider responsible for fishing information. In an embodiment, the portal database server 110 transmits the user's CPUI with the request for data. For example, if a user makes a user request for a web page with two portlets, then the portal database server 110 transmits a request for data to each provider 120 supplying data to either of the portlets. The CPUI may be transmitted with the request to the provider 120 as well in an embodiment, as it may assist in retrieving data from the content provider 160. Note that in certain embodiments the provider 120 may be able to provide the content for the user request without contacting a content retriever 140. Such an embodiment may be used when the provider 120 does not obtain content from a content provider 160, but is itself responsible for retrieving and supplying content.

Thereafter, in an embodiment, the provider 120 communicates the request for data to those content retrievers 140 required in satisfying the request 1050. For example, if the request for data concerns world news, then only the content retriever 140 responsible for retrieving world news data from the content provider 160 may needed to service the request. In an embodiment, the CPUI is also transmitted with the communicated request.

Next, in step 1060, the content retrievers 140 contacted in step 1050 retrieve data from the content providers 160 according to an embodiment. In an embodiment, the CPUI may be used to retrieve data from the content provider 160 to satisfy the user request.

Finally, in step 1070, the data is returned to the portal database server 110, assembled, and delivered to the requesting web browser 101 according to an embodiment. The content retrievers 140 transmit the retrieved data from the content providers 160 to the portal database server 110 via the providers 120. The portal database server 110 assembles the content of the request web page, and transmits the assembled web page to the requesting user.

The description of FIG. 10 may be employed when users request content for portlets they may have customized. As the CPUI uniquely identifies the user, and the CPUI is transmitted to the content provider 160 with the request for data, the content provider 160 may tailor the content request to the individual requesting user. A user may store content customizations or preferences with any content provider 160 with their CPUI, allowing subsequent content requests from that user to be answered in view of their customizations or preferences. In an embodiment, the portal database server 110 allows the user to store customizations and preferences at the content provider 160 by displaying a web page to receive user customizations and preferences, and transparently managing the CPUI on the back end. In other words, the user records any customizations and preferences on the front end display, which is subsequently transmitted to the content provider 160 with the CPUI by the portal database server 110.

For the sake of clarity and brevity, only three content retrievers 140 and two content providers 160 are depicted in FIG. 8. As it would be advantageous to support a diverse selection of available content through the portal management system 100, many content retrievers 140 connecting to many content providers 160 may be employed using the teachings herein. Accordingly, the invention is not limited to any particular number or arrangement of content retrievers 140 and/or content providers 160.

V. Knowledge Management Portlet

In embodiments of the invention, the portal management system 100 includes a knowledge management tool, herein called a knowledge management portlet 1200. A knowledge management portlet 1200 is a portlet that is coupled to a knowledge base to with which a user may interact. A knowledge base, as used herein, is a set of facts, data, and/or information. In certain embodiments, the interaction between the user and the knowledge base may take place through a series of questions. In an embodiment, the questions may originate with the user, e.g., a FAQ. In another embodiment, the questions may originate with the knowledge management portlet 1200, e.g., a survey. The functionality of the knowledge management portlet 1200 may be provided through a provider 120, which in turn may be operatively connected to a database which stores the knowledge base, including survey questions and information related to and obtained from user interaction with the knowledge base.

In an embodiment, the knowledge management portlet 1200 may be directed towards surveying one or more users to obtain data related to a series of configurable questions ("a survey"), which may be subsequently reported on through a graphic display. The customization of the questions posed by the knowledge management portlet 1200 during a survey ("survey questions") may be restricted to a set of users, such as an administrator, in an embodiment. The customizations of the survey questions for a survey are stored within the database. The survey questions may be constructed through a portlet, such as the one shown in FIG. 12, according to an embodiment of the invention. Through the portlet shown in FIG. 12, a new survey may be created, or alternately, an existing survey may be selected, and subsequently edited, deleted, purged, or copied. When a user edits a survey, the stored options, questions, or alternative answers for the survey may be revised in an embodiment. When a user deletes a survey, all questions, answers, and responses for the survey are removed from the database in an embodiment. When a user purges a survey, all the responses stored in the database for a given administration of the survey are removed in an embodiment. When a user copies a survey, a copy of all the questions and answers for a survey are created under a new survey name in an embodiment.

FIG. 13 is a flow chart that depicts the functional steps of creating a new survey according to an embodiment of the invention. In an embodiment, the first step 1310 in creating a new survey is to display an introductory screen to the user, such as the introductory screen shown in FIG. 14 according to an embodiment of the invention. The introductory screen of FIG. 14 provides instructions to the user on how to start creating a survey, as well as a graphical display indicting the user's progress in the survey creation progress.

In an embodiment, the next step 1320 in creating a new survey is to configure survey setup information. Survey setup information may be stored in the database and may describe the general operation of the survey. Survey setup information may be configured through a portlet, such as the survey builder portlet 1500 depicted in FIG. 15A and FIG. 15B, according to an embodiment. As FIG. 15A and FIG. 15B show, a survey builder portlet 1500 may be used to configure survey setup information by providing a user interface to obtain user input on topics such as: identification information section 1510, recipient information section 1520, multiple replies section 1530, portlet placement section 1540, end of survey options section 1550, welcome messages section 1560, and closing comments section 1570.

The identification information section 1510 allows a user to configure information that identifies the survey, such as a survey name and a content area. A survey name is a unique name to internally identify the survey. In an embodiment, entering a survey name is mandatory. A content area identifies a storage area where the text responses to the survey will be stored. The recipient information section 1520 allows a user to configure how respondents to the survey may be identified, e.g., by login id, name, email, etc. In an embodiment, anonymous recipients may be allowed by not entering any preferences in the recipient information section 1520. The multiple replies section 1530 allows a user to configure whether the survey shall permit the same user to respond to the survey more than once. The portlet placement section 1540 allows a user to configure which web page, if any, the survey should be displayed. The end of survey options section 1550 allows a user to configure what the recipients will see and do after they have completed the survey. For example, a recipient may be shown nothing, a set of accumulated results, or their own results to the survey in an editable form. The welcome message section 1560 allows a user to configure what, if any, welcome messages will be shown to each recipient taking the survey. The closing comments section 1570 allows a user to configure what, if any, closing comments will be shown to each recipient taking the survey.

In an embodiment, the next step 1330 is to create each question in the survey. The creation of each question in the survey may be performed, in an embodiment, through a graphical user interface, such as the graphical user interface depicted in FIG. 16 according to an embodiment of the invention. In the embodiment of FIG. 16, the right side of the display may be used to specify a question, and the left side of the display may be used to view and manage the list of survey questions specified thus far. The question creation portion 1610 displayed on the right allows a user to specify a question, assign the question to a particular section of the survey, determine the display style of the question, specify potential answers to the question, and trigger the display of other sections of the survey off given answers. Advantageously, the user may determine sections composed of a set of questions, and trigger the display of those sections if and only if certain answers are given for a specific question. The user may view and manage the created questions through a question management portion 1650 presented on the left. The question management portion 1650 displays sections 1660 composed of survey questions 1670. Each survey question 1670 may be moved within the particular section 1660 it is located in by selecting an appropriate movement arrow 1680 to move the question up or down in the section relative to the other questions, or deleted by selecting the delete key 1685. The question management portion 1650 may also display answers 1690 under a survey question 1670.

In an embodiment, the next step 1340 is to review and confirm the created survey. Step 1340 may be performed through a graphical user interface, such as the review and confirm user interface 1700 depicted in FIG. 17. The review and confirm user interface 1700 shows the survey as it would look to a respondent taking the survey. If a change to the composition or presentation of the survey is desired, then the user may effect the change by selecting the back button on the review and confirm user interface 1700 to the relevant screen to effect the change. If no changes are desired, then by selecting finish, then the survey will be created and stored within the database.

In an embodiment, a survey answer form customization portlet 1800 is used by an administrator to customize the presentation of the rendered survey. In the embodiment of the survey answer form customization portlet 1800 depicted in FIG. 18A, the administrator determines such attributes as how long the survey will be presented to users, how many questions will be presented per web page, and font and color choices for portions of the survey. The survey answer form portlet 1850 may be displayed dynamically based on the choices made in the survey builder portlet 1500. For example, the survey answer form portlet 1850 may be placed on a web page either by the selection of an appropriate checkbox in the portlet placement section 1540 of the survey builder portlet 1500, or by the administrator manually placing the survey answer form portlet 1850 on the web page. After the administrator selects preferences regarding the appearance of the survey form, the administrator may deploy the survey to recipients who will take the survey through the survey answer form portlet 1850 by clicking an appropriate button. Subsequently, the survey may be rendered by the survey answer form portlet 1850 to allow recipients to take the survey, as shown in FIG. 18B, which is a graphical illustration of a portion of the survey answer form portlet according to an embodiment of the invention. The portion of the rendered survey depicted in FIG. 18B is rendered according to preferences configured in the survey answer form customization portlet 1800; consequently, the rendered survey of FIG. 18B is merely illustrative, as numerous styles and formats of rendered surveys are possible.

In an embodiment, after users have taken a survey, the knowledge management portlet 1200 may provide functionality to generate reports on the collected data. In an embodiment, a report portlet 1950 may be used to generate reports based upon the collected data from the surveys. An illustrative report configuration portlet 1900 is depicted in FIG. 19A according to an embodiment of the invention. The report configuration portlet 1900 may be used to configure the display of the report. An illustrative report 1950 generated using the report portlet are depicted in FIGS. 19B and 19C according to an embodiment of the invention.

In various embodiments of the invention, the knowledge management portlet 1200 may be used to manage the creation and displays of FAQs, or frequently asked question lists. In such embodiments, a FAQ builder portlet 2100 may be employed, which is a portlet that allows an administrator to create a customized FAQ. The sequence of steps in creating a FAQ with a FAQ builder portlet 2100 shall now be presented with reference to FIG. 20, which is a flow chart illustrating the steps to accomplish the same according to an embodiment of the invention. The first step 2010, in an embodiment, is to initiate the creation of a new FAQ through the FAQ builder portlet 2100, which may be done in the embodiment of the FAQ builder portlet 2100 depicted in FIG. 21 by clicking the 'Create a New FAQ' link. The FAQ builder portlet 2100 of FIG. 21 also supports editing an existing or deleting an existing FAQ by selecting the appropriate mechanism on the screen.

The next step 2020 in creating a FAQ, according to an embodiment, is to configure FAQ setup information. In an embodiment, step 2020 may be performed through a portlet, such as the portlet 2200 depicted in FIG. 22 according to an embodiment. Through the portlet 2200 depicted in FIG. 22, setup information such as the FAQ name, welcome and closing messages, and storage areas in which the FAQ information is stored may be configured.

After the FAQ setup information is configured, the next step 2030 according to an embodiment is to create each question in the FAQ. In an embodiment, step 2030 may be preformed through a portlet, such as the portlets depicted in FIG. 23A and FIG. 23B according to an embodiment. As FIG. 23A shows, questions and answers may be added through the interface on the right side 2350 of the screen; a list of questions added thus far appear on the left 2360. The relative position of a question in the list may be adjusted by selecting an appropriate movement arrow 2310 to move the question up or down in the list. In embodiments, each question may be associated with a particular FAQ category. An FAQ category is a group of associated questions within a single FAQ. FIG. 23B shows the list of questions on the left 2360 with two FAQ categories, namely 'Maintenance' and 'Picking a Car.' FAQ categories advantageously provide for logical arrangements of questions within a single FAQ.

Subsequently, in an embodiment, the final step 2040 is to review and confirm the recorded FAQ data. Step 2040 may be performed through a portlet, such as the portlet 2400 depicted in FIG. 24 according to an embodiment of the invention. As FIG. 24 shows, the FAQ as created may be reviewed for completeness and accuracy. If any changes are desired, then by selecting the back button, or equivalent means, the user may be given an opportunity to correct any prior configuration choices.

In an embodiment, a FAQ presentation configuration portlet 2500 is used by an administrator to customize the presentation of the FAQ. According to the embodiment of the FAQ presentation configuration portlet 2500 depicted in FIG. 25A, the administrator determines such attributes as how many questions to display per page, whether to allow hyperlinks to answers, whether to count page hits, and font and color selection for various portions of the FAQ. After the administrator records or configures his or her preferences regarding the appearance of the FAQ, the administrator may deploy the FAQ to users who may subsequently view the rendered FAQ, such as the FAQ presentation portlet 2550 depicted in FIG. 25B, which is a graphical illustration of the FAQ presentation portlet 2550 according to an embodiment of the invention.

VI. Deployment Considerations

The execution of the sequences of instructions required to practice the invention may be performed in embodiments of the invention by a computer system 1100. In an embodiment of the invention, execution of the sequences of instructions required to practice the invention is performed by a single computer system 1100. According to other embodiments of the invention, two or more computer systems 1100 coupled by a communication link 1115 may perform the sequence of instructions required to practice the invention in coordination with one another. In order to avoid needlessly obscuring the invention, a description of only one computer system 1100 will be presented below; however, it should be understood that any number of computer systems 1100 may be employed to practice the invention.

A computer system 1100 according to an embodiment of the invention will now be described with reference to FIG. 11, which is a block diagram of the functional components of a computer system 1100 according to an embodiment of the invention. As used herein, the term computer system 100 is broadly used to describe any computing device that can store and independently run one or more programs.

Each computer system 1100 may include a communication interface 1114 coupled to the bus 1106. The communication interface 1114 provides two-way communication between computer systems 1100. The communication interface 1114 of a respective computer system 1100 transmits and receives electrical, electromagnetic or optical signals, that include data streams representing various types of signal information, e.g., instructions, messages and data. A communication link 1115 links one computer system 1100 with another computer system 1100. For example, the communication link 1115 may be a LAN, in which case the communication interface 1114 may be a LAN card, or the communication link 1115 may be a PSTN, in which case the communication interface 1114 may be an integrated services digital network (ISDN) card or a modem.

A computer system 1100 may transmit and receive messages, data, and instructions, including program, i.e., application, code, through its respective communication link 1115 and communication interface 1114. Received program code may be executed by the respective processor(s) 1107 as it is received, and/or stored in the storage device 1110, or other associated non-volatile media, for later execution.

In an embodiment, the computer system 1100 operates in conjunction with a data storage system 1131, e.g., a data storage system 1131 that contains a database 1132 that is readily accessible by the computer system 1100. The computer system 1100 communicates with the data storage system 1131 through a data interface 1133. A data interface 1133, which is coupled to the bus 1106, transmits and receives electrical, electromagnetic or optical signals, that include data streams representing various types of signal information, e.g., instructions, messages and data. In embodiments of the invention, the functions of the data interface 1133 may be performed by the communication interface 1114.

Computer system 1100 includes a bus 1106 or other communication mechanism for communicating instructions, messages and data, collectively, information, and one or more processors 1107 coupled with the bus 1106 for processing information. Computer system 1100 also includes a main memory 1108, such as a random access memory (RAM) or other dynamic storage device, coupled to the bus 1106 for storing dynamic data and rise instructions to be executed by the processor(s) 1107. The main memory 1108 also may be used for storing temporary data, i.e., variables, or other intermediate information during execution of instructions by the processor(s) 1107.

The computer system 1100 may further include a read only memory (ROM) 1109 or other static storage device coupled to the bus 1106 for storing static data and instructions for the processor(s) 1107. A storage device 1110, such as a magnetic disk or optical disk, may also be provided and coupled to the bus 1006 for storing data and instructions for the processor(s) 1107.

A computer system 1100 may be coupled via the bus 1106 to a display device 1111, such as, but not limited to, a cathode ray tube (CRT), for displaying information to a user. An input device 1112, e.g., alphanumeric and other keys, is coupled to the bus 1106 for communicating information and command selections to the processor(s) 1107.

According to one embodiment of the invention, an individual computer system 1100 performs specific operations by their respective processor(s) 1107 executing one or more sequences of one or more instructions contained in the main memory 1108. Such instructions may be read into the main memory 1108 from another computer-usable medium, such as the ROM 1109 or the storage device 1110. Execution of the sequences of instructions contained in the main memory 1108 causes the processor(s) 1107 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 1107. Such a medium may take many forms, including, but not limited to, non-volatile, volatile and transmission media. Non-volatile media, i.e., media that can retain information in the absence of power, includes the ROM 1109, CD ROM, magnetic tape, and magnetic discs. Volatile media, i.e., media that can not retain information in the absence of power, includes the main memory 1108. Transmission media includes coaxial cables, copper wire and fiber optics, including the wires that comprise the bus 1106. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

What is claimed is:

1. A method for deploying a knowledge management tool over a worldwide computer network, comprising:

accepting access to a portal database server from a first user;

displaying a survey builder portlet on the portal;

receiving information identifying an appearance and operation of a survey from the first user, the information identifying the appearance and operation of the survey being transmitted through the survey builder portlet by configuring a set of survey builder options; and storing the information identifying the appearance and operation of the survey in a database operatively connected to the portal database server.

2. The method of claim 1, wherein the information identifying the appearance and operation of the survey comprises information identifying the survey and information determining if users are permitted to respond to the survey more than once.

3. The method of claim 1, wherein the information identifying the appearance and operation of the survey comprises one or more sections, each section comprising one or more survey questions.

4. The method of claim 3, wherein the information identifying the appearance and operation of the survey further comprises one or more answers to the one or more survey questions.

5. The method of claim 4, wherein the information identifying the appearance and operation of the survey further comprises a section trigger associated with at least one of the answers, the section trigger indicating the section of questions to display upon the selection of the answer.

6. The method of claim 4, further comprising:
accepting access to the portal database server from a second user;
displaying the survey to the second user through a second portlet; and
receiving a response to the survey from the second user, the response comprising a selected answer to one or more of the survey questions.

7. The method of claim 6, further comprising:
generating a report based on a plurality of responses, the report displaying the selected answers and a percentage representing a number of responses that included the selected answers out of a total number of responses, the report being displayable through either the first portlet or the second portlet or both.

8. The method of claim 1, wherein the information identifying the appearance and operation of the survey comprises a beginning and ending date of the survey availability.

9. The method of claim 1, wherein the information identifying the appearance and operation of the survey comprises information on how to identify a respondent.

10. The method of claim 6, wherein the information identifying the appearance and operation of the survey comprises a location of the second portlet on the portal.

11. The method of claim 1, wherein the information identifying the appearance and operation of the survey comprises an end of survey option, a welcome message, or a closing comment.

12. The method of claim 1, further comprising
reviewing the survey as it will appear to a responder; and
confirming the information identifying the appearance and operation of the survey as complete.

13. The method of claim 1, wherein accepting access to the portal database server from the first user comprises authenticating the user via a login server.

14. The method of claim 1, wherein displaying the survey builder portlet on the portal comprises displaying the information identifying the appearance and operation of an existing survey set in the survey builder portlet.

15. The method of claim 14, wherein configuring the set of survey builder options comprises editing the information identifying the appearance and operation of the existing survey set in the survey builder portlet.

16. The method of claim 4, further comprising copying the survey, the copying comprising attaching a new survey name to a copy of the survey questions and answers.

17. The method of claim 6, further comprising purging the survey, the purging comprising removing the responses to a survey from the database for a given administration of the survey.

18. The method of claim 6, further comprising deleting a survey, the deleting comprising removing the questions, answers and responses to a survey from the database.

19. A system for deploying a knowledge management tool over a worldwide computer network, comprising:
logic for accepting access to a portal database server from a first user;
logic for displaying a survey builder portlet on the portal;
logic for receiving information identifying an appearance and operation of a survey from the first user, the receiving logic comprising, logic for transmitting the information identifying the appearance and operation of the survey through the survey builder portlet and logic for configuring a set of survey builder options; and
logic for storing the information identifying the appearance and operation of the survey in a database operatively connected to the portal database server.

20. The system of claim 19, wherein the information identifying the appearance and operation of the survey comprises information identifying the survey and information determining if users are permitted to respond to the survey more than once.

21. The system of claim 19, wherein the information identifying the appearance and operation of the survey comprises one or more sections, each section comprising one or more survey questions.

22. The system of claim 21, wherein the information identifying the appearance and operation of the survey further comprises one or more answers to the one or more survey questions.

23. The system of claim 22, wherein the information identifying the appearance and operation of the survey further comprises a section trigger associated with at least one of the answers, the section trigger indicating the section of questions to display upon the selection of the answer.

24. The system of claim 22, further comprising:
logic for accepting access to the portal database server from a second user;
logic for displaying the survey to the second user through a second portlet; and
logic for receiving a response to the survey from the second user, the response comprising a selected answer to one or more of the survey questions.

25. The system of claim 24, further comprising:
logic for generating a report based on a plurality of responses, the report displaying the selected answers and a percentage representing a number of responses that included the selected answers out of a total number of responses, the report being displayable through either the first portlet or the second portlet or both.

26. The system of claim 19, wherein the information identifying the appearance and operation of the survey comprises a beginning and ending date of the survey availability.

27. The system of claim 19, wherein the information identifying the appearance and operation of the survey comprises information on how to identify a respondent.

28. The system of claim 24, wherein the information identifying the appearance and operation of the survey comprises a location of the second portlet on the portal.

29. The system of claim 19 wherein the information identifying the appearance and operation of the survey comprises an end of survey option, a welcome message, or a closing comment.

30. The system of claim 19, further comprising
logic for reviewing the survey as it will appear to a responder; and
logic for confirming the information identifying the appearance and operation of the survey as complete.

31. The system of claim 19, wherein logic for accepting access to the portal database server from the first user comprises logic for authenticating the user via a login server.

32. The system of claim 19, wherein the logic for displaying the survey builder portlet on the portal comprises logic for displaying the information identifying the appearance and operation of an existing survey set in the survey builder portlet.

33. The system of claim 32, wherein the logic for configuring the set of survey builder options comprises logic for editing the information identifying the appearance and operation of the existing survey set in the survey builder portlet.

34. The system of claim 22, further comprising
logic for copying the survey, the copying comprising logic for attaching a new survey name to a copy of the survey questions and answers.

35. The system of claim 24, further comprising
logic for purging the survey, the logic for purging comprising logic for removing the responses to a survey from the database for a given administration of the survey.

36. The system of claim 24, further comprising
logic for deleting a survey, the logic for deleting comprising logic for removing the questions, answers and responses to a survey from the database.

37. A computer program product embodied on computer readable medium, the computer readable medium having stored thereon a sequence of instructions which, when executed by a processor, causes the processor to execute a method for deploying a knowledge management tool over a worldwide computer network, the method comprising:
accepting access to a portal database server from a first user;
displaying a survey builder portlet on the portal;
receiving information identifying an appearance and operation of a survey from the first user, the information identifying the appearance and operation of the survey being transmitted through the survey builder portlet by configuring a set of survey builder options; and
storing the information identifying the appearance and operation of the survey in a database operatively connected to the portal database server.

38. The computer program product of claim 37, wherein the information identifying the appearance and operation of the survey comprises information identifying the survey and information determining if users are permitted to respond to the survey more than once.

39. The computer program product of claim 37, wherein the information identifying the appearance and operation of the survey comprises one or more sections, each section comprising one or more survey questions.

40. The computer program product of claim 39, wherein the information identifying the appearance and operation of the survey further comprises one or more answers to the one or more survey questions.

41. The computer program product of claim 40, wherein the information identifying the appearance and operation of the survey further comprises a section trigger associated with at least one of the answers, the section trigger indicating the section of questions to display upon the selection of the answer.

42. The computer program product of claim 40, further comprising:
accepting access to the portal database server from a second user;
displaying the survey to the second user through a second portlet; and
receiving a response to the survey from the second user, the response comprising a selected answer to one or more of the survey questions.

43. The computer program product of claim 42, further comprising:
generating a report based on a plurality of responses, the report displaying the selected answers and a percentage representing a number of responses that included the selected answers out of a total number of responses, the report being displayable through either the first portlet or the second portlet or both.

44. The computer program product of claim 37, wherein the information identifying the appearance and operation of the survey comprises a beginning and ending date of the survey availability.

45. The computer program product of claim 37, wherein the information identifying the appearance and operation of the survey comprises information on how to identify a respondent.

46. The computer program product of claim 42, wherein the information identifying the appearance and operation of the survey comprises a location of the second portlet on the portal.

47. The computer program product of claim 37, wherein the information identifying the appearance and operation of the survey comprises an end of survey option, a welcome message, or a closing comment.

48. The computer program product of claim 37, further comprising
reviewing the survey as it will appear to a responder; and
confirming the information identifying the appearance and operation of the survey as complete.

49. The computer program product of claim 37, wherein accepting access to the portal database server from the first user comprises authenticating the user via a login server.

50. The computer program product of claim 37, wherein displaying the survey builder portlet on the portal comprises displaying the information identifying the appearance and operation of an existing survey set in the survey builder portlet.

51. The computer program product of claim 50, wherein configuring the set of survey builder options comprises editing the information identifying the appearance and operation of the existing survey set in the survey builder portlet.

52. The computer program product of claim 40, further comprising copying the survey, the copying comprising attaching a new survey name to a copy of the survey questions and answers.

53. The computer program product of claim 42, further comprising purging the survey, the purging comprising removing the responses to a survey from the database for a given administration of the survey.

54. The computer program product of claim 42, further comprising deleting a survey, the deleting comprising removing the questions, answers and responses to a survey from the database.

55. A method for deploying a knowledge management tool over a worldwide computer network, comprising:
accepting access to a portal database server from a first user;
displaying a FAQ builder portlet on the portal;
receiving information identifying an appearance and operation of a FAQ from the first user, the information identifying the appearance and operation of the FAQ being transmitted through the FAQ builder portlet by configuring a set of FAQ builder options; and
storing the information identifying the appearance and operation of the FAQ in a database operatively connected to the portal database server.

56. The method of claim 55, wherein the information identifying the appearance and operation of the FAQ comprises information identifying the FAQ.

57. The method of claim 55, wherein the information identifying the appearance and operation of the FAQ comprises one or more questions, and answers to each of the one or more questions each question able to be associated with a category.

58. The method of claim 55, wherein the information identifying the appearance and operation of the FAQ comprises a number of questions to display per page, a font selection, and a color selection.

59. The method of claim 57, wherein the information identifying the appearance and operation of the FAQ comprises an indication of whether to allow hyperlinks to answers, and an indication of whether to count page hits.

60. The method of claim 55, further comprising:

accepting access to the portal database server from a second user; and displaying the FAQ to the second user through a second portlet.

61. The method of claim 60, wherein the information identifying the appearance and operation of the FAQ comprises a location of the second portlet on the portal.

62. The method of claim 55, wherein the information identifying the appearance and operation of the FAQ comprises an end of FAQ option, a welcome message, or a closing comment.

63. The method of claim 55, further comprising reviewing the FAQ as it will appear to a user; and confirming the information identifying the appearance and operation of the FAQ as complete.

64. The method of claim 55, wherein accepting access to the portal database server from the first user comprises authenticating the user via a login server.

65. The method of claim 55, wherein displaying the FAQ builder portlet on the portal comprises displaying the information identifying the appearance and operation of an existing FAQ set in the FAQ builder portlet.

66. The method of claim 65, wherein configuring the set of FAQ builder options comprises editing the information identifying the appearance and operation of the existing FAQ set in the FAQ builder portlet.

67. The method of claim 57, further comprising copying the FAQ, the copying comprising attaching a new FAQ name to a copy of the FAQ questions and answers.

68. The method of claim 57, further comprising deleting a FAQ, the deleting comprising removing the questions, and answers of a FAQ from the database.

69. A system for deploying a knowledge management tool over a worldwide computer network, the system comprising:

logic for accepting access to a portal database server from a first user;

logic for displaying a FAQ builder portlet on the portal;

logic for receiving information identifying an appearance and operation of a FAQ from the first user, the logic for receiving comprising logic for transmitting information identifying the appearance and operation of the FAQ being through the FAQ builder portlet and logic for configuring a set of FAQ builder options; and logic for storing the information identifying the appearance and operation of the FAQ in a database operatively connected to the portal database server.

70. A computer program product embodied on computer readable medium, the computer readable medium having stored thereon a sequence of instructions which, when executed by a processor, causes the processor to execute a method for deploying a knowledge management tool over a worldwide computer network, the method comprising:

accepting access to a portal database server from a first user;

displaying a FAQ builder portlet on the portal;

receiving information identifying an appearance and operation of a FAQ from the first user, the information identifying the appearance and operation of the FAQ being transmitted through the FAQ builder portlet by configuring a set of FAQ builder options; and storing the information identifying the appearance and operation of the FAQ in a database operatively connected to the portal database server.

* * * * *